US007858930B2

(12) United States Patent
Kaiser et al.

(10) Patent No.: US 7,858,930 B2
(45) Date of Patent: Dec. 28, 2010

(54) ION-TRAPPING DEVICES PROVIDING SHAPED RADIAL ELECTRIC FIELD

(75) Inventors: Nathan K. Kaiser, Tallahassee, FL (US); James E. Bruce, Seattle, WA (US)

(73) Assignee: Washington State University, Pullman, WA (US)

( * ) Notice: Subject to any disclaimer, the term of this patent is extended or adjusted under 35 U.S.C. 154(b) by 203 days.

(21) Appl. No.: 12/334,259

(22) Filed: Dec. 12, 2008

(65) Prior Publication Data

US 2009/0218485 A1 Sep. 3, 2009

Related U.S. Application Data

(60) Provisional application No. 61/013,131, filed on Dec. 12, 2007.

(51) Int. Cl.
*H01J 49/42* (2006.01)
*B01D 59/44* (2006.01)

(52) U.S. Cl. ....................... 250/282; 250/283; 250/281; 250/286; 250/291; 250/292; 250/297; 250/290

(58) Field of Classification Search ................. 250/282, 250/283, 281, 286, 291, 292, 290, 297
See application file for complete search history.

(56) References Cited

U.S. PATENT DOCUMENTS 5,019,706 A 5/1991 Allemann et al.
6,573,495 B2 6/2003 Senko
7,034,286 B2 * 4/2006 Guevremont et al. ........ 250/282
7,351,961 B2 * 4/2008 Malek et al. ................ 250/291
7,365,317 B2 * 4/2008 Whitehouse et al. ........ 250/292
2003/0132379 A1 * 7/2003 Li .............................. 250/286
2005/0118724 A1 6/2005 Bateman et al.
2005/0230613 A1 10/2005 Cotter et al.
2005/0242279 A1 11/2005 Verentchikov
2005/0253064 A1 11/2005 Loboda et al.
2007/0029474 A1 2/2007 Cotter et al.
2007/0029476 A1 2/2007 Senko et al.
2007/0040114 A1 2/2007 Malek et al.
2007/0187585 A1 8/2007 Verentchikov

OTHER PUBLICATIONS

Bruce et al., "A Novel High-Performance Fourier Transform Ion Cyclotron Resonance Cell for Improved Biopolymer Characterization," *J. Mass Spectrom.*, 35:85-94 (2000).

Comisarow et al., "Fourier Transform Ion Cyclotron Resonance Spectroscopy," *Chem. Phys. Lett.*, 25(2):282-283 (1974).

(Continued)

*Primary Examiner*—Nikita Wells
(74) *Attorney, Agent, or Firm*—Klarquist Sparkman, LLP

(57) ABSTRACT

Disclosed are ion cyclotron resonance (ICR) cells and other ion-trapping cells with plural groups of multiple trapping electrodes for shaping (e.g., flattening) the radial electric field within the ICR cell. Also disclosed are methods for controlling the electric field to diminish effects of de-phasing. The diminished effects are achieved by decreasing space-charge contributions by increasing the length of the ion-oscillation path along the z-axis of the ICR cell. The methods and devices enhance the time-domain signal of a Fourier-transform ion-cyclotron resonance mass spectrometer (FTICR-MS) and provide enhanced resolution and accuracy of mass measurements.

30 Claims, 15 Drawing Sheets

OTHER PUBLICATIONS

Guan et al., "Ion Traps for Fourier Transform Ion Cyclotron Resonance Mass Spectrometry: Principles and Design of Geometric and Electric Configurations," *Int. J. Mass Spectrom. Ion Proc.*, 146/147:261-296 (1995).

Jackson et al., "Matrix-Shimmed Ion Cyclotron Resonance Ion Trap Simultaneously Optimized for Excitation, Detection, Quadrupolar Axialization, and Trapping," *J. Am. Soc. Mass Spectrom.*, 10:759-769 (1999).

Kaiser, et al., "Observation of Increased Ion Cyclotron Resonance Signal Duration through Electric Field Perturbations," *Anal. Chem.*, 77(18):5973-5981 (2005).

Kaiser et al., "Reduction of Axial Kinetic Energy Induced Perturbations on Observed Cyclotron Frequency," *J. Am. Soc. Mass Spectrom.*, 19:467-478 (2008).

Kaiser et al., "Reduction of Ion Magnetron Motion and Space Charge Using Radial Electric Field Modulation," *Int. J. Mass Spectrom.*, 265:271-280 (2007).

Kanawati et al., "Characterization of a New Open Cylindrical Ion Cyclotron Resonance Cell with Unusual Geometry," *Rev. Sci. Instrum.*, 78:074102-1-074102-8 (2007).

Marshall et al., "Fourier Transform Ion Cyclotron Resonance Mass Spectrometry: A Primer," *Mass Spectrom. Rev.*, 17:1-35 (1998).

Ostrander et al., "Central Ring Electrode for Trapping and Excitation/Detection in Fourier Transform Ion Cyclotron Resonance Mass Spectrometry," *J. Am. Soc. Mass Spectrom.*, 12:30-37 (2000).

Solouki et al., "Detection of High-Mass Biomolecules in Fourier Transform Ion Cyclotron Resonance Mass Spectrometry: Theoretical and Experimental Investigations," *Anal. Chem.*, 66(9):1583-1587 (1994).

* cited by examiner

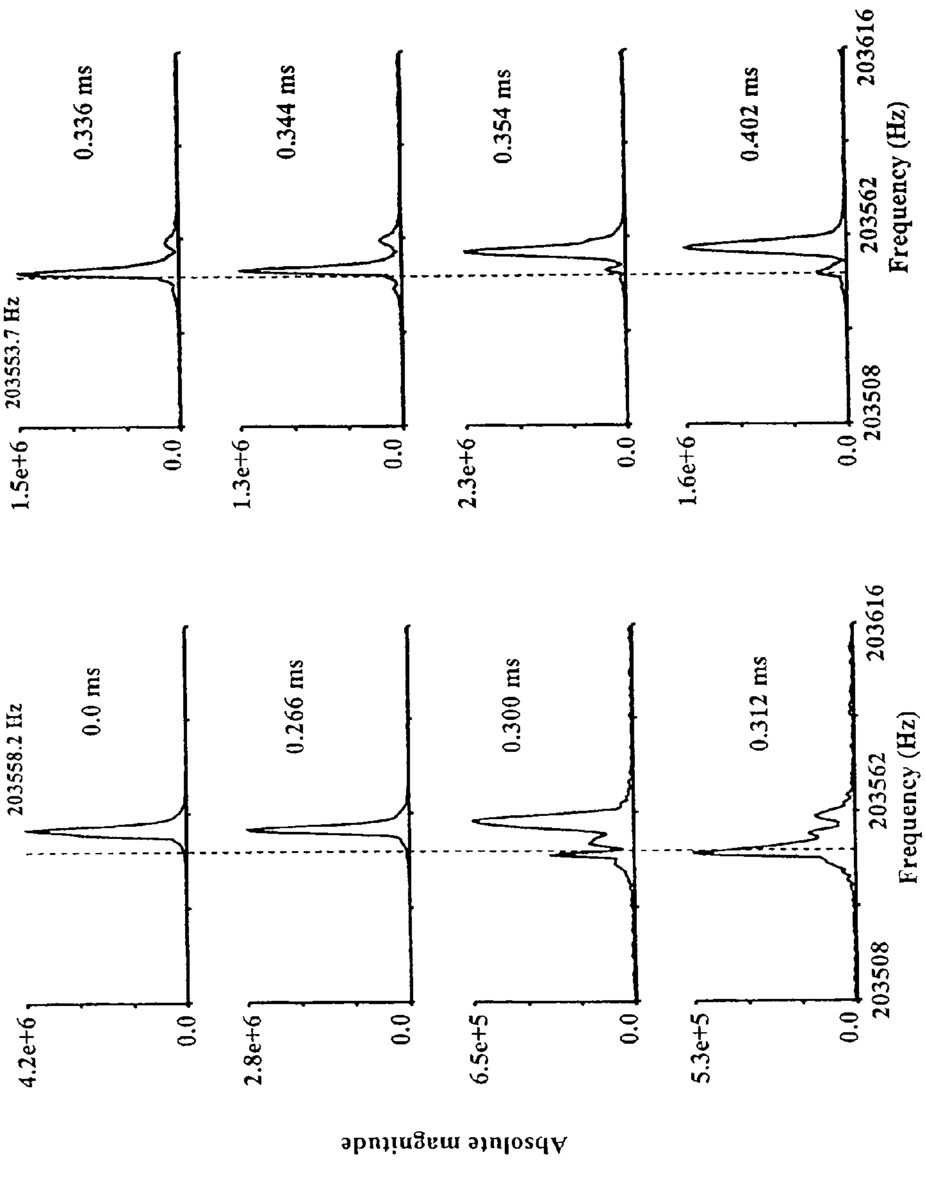
FIG. 11A
FIG. 11B
FIG. 11C
FIG. 11D
FIG. 11E
FIG. 11F
FIG. 11G
FIG. 11H
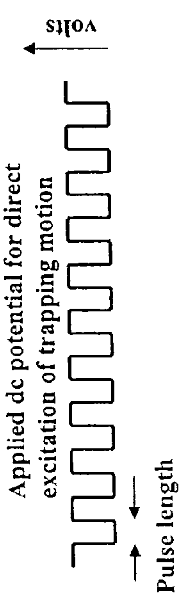
FIG. 11I

ION-TRAPPING DEVICES PROVIDING SHAPED RADIAL ELECTRIC FIELD

CROSS-REFERENCE TO RELATED APPLICATION

This application claims priority to, and the benefit of, U.S. Provisional Patent Application No. 61/013,131, filed on Dec. 12, 2007, incorporated herein by reference in its entirety.

ACKNOWLEDGMENT OF GOVERNMENT SUPPORT

This invention was made with Government support under Grant No. DBI-0352451 awarded by the National Science Foundation. The Government has certain rights in this invention.

FIELD

This application is directed to, inter alia, methods and apparatus for generating an electric field in an ion trap as used in a mass analyzer, for example.

BACKGROUND

Accurate high-resolution and high-sensitivity mass measurements are important in many areas, such as for example proteomics and metabolomics. Fourier transform ion cyclotron resonance mass spectrometers (FTICR-MS) can provide high-performance mass measurements in part because such systems are capable of detecting ions for an extended period of time and of simultaneously detecting different ion species. Therefore, FTICR mass spectrometry has become an important analytical tool for ion analysis and especially in the analysis of complex mixtures.

A FTICR-MS is a type of mass analyzer (i.e., mass spectrometer) for determining a mass-to-charge ratio (m/z) of ions based on a measured frequency of ion motion in a magnetic field. In a basic implementation of a FTICR-MS, gaseous ions are accumulated and introduced into a detection element of a FTICR-MS instrument, such as an ion-cyclotron resonance (ICR) cell or an ion-trapping cell, situated within a strong magnetic field. The magnetic field is typically aligned along a z-axis or a central longitudinal axis of the cell. The cell includes trapping electrodes that produce an electric field to trap ions within the cell along the z-axis. The trapped ions typically have non-zero kinetic energies in the z-direction and move along the z-axis of the cell following spring-like paths, wherein the spring-like paths are compressed near the longitudinal termini of the cell.

Trapped ions are induced into orbital motion about the z-axis or in an x-y plane of the ICR cell as a result of the Lorentz force and the interaction of ions with electric and magnetic fields in the cell. The net motion of the ions in the cell is a combination of longitudinal travel along the z-axis and latitudinal orbital motion about the z-axis. An orbital component of an ion's motion can be referred to as "cyclotron motion." The periodicity of this cyclotron motion, referred to as the "cyclotron frequency," is related to the m/z of the ion. Typically, an RF (radio frequency) voltage is applied to excitation electrodes to produce an oscillating electric field that induces resonant excitation of the orbiting ions. Ions of the same m/z are excited together and form a coherent ion cloud or ion packet having increased spatial coherence. Resonant excitation also transfers kinetic energy to the ions, thereby increasing their cyclotron orbital radii about the z-axis. The excitation electric field can therefore be used to improve ion detection through formation of ion packets having measurable respective cyclotron frequencies.

As ion packets traverse their cyclotron orbits, they induce oscillating currents in detection electrodes. The detected oscillatory signal is representative of an image current produced as a packet of ions passes close to detection electrodes while orbiting about the z-axis. Accordingly, the relative distance of the packet from the detection electrodes and the collective charge of ions in the packet are directly related to intensity of the detected signal. Typically, a free induction decay (FID) or time-domain signal is measured. The FID signal is an interferogram or a superposition of sine waves representing ions of different m/z values orbiting in the ICR cell. The waves decay in amplitude over time as the radius and/or phase coherence of the orbital motion of the ions decreases. Since the m/z of an ion is inversely proportional to the cyclotron frequency of the ion, a mass spectrum can be extracted from the FID signal by Fourier transforming the signal to generate a frequency spectrum. The frequency spectrum can be converted to a mass spectrum using a calibration equation relating frequency to m/z.

Resolution, mass accuracy, and sensitivity of FTICR-MS measurements can be improved by increasing the length of the time-domain signal, increasing the radius of ion motion, or increasing the detectable duration of an FID signal. But, FID-signal duration can be disadvantageously decreased by events such as ion collisions and ion de-phasing. Ion collisions generate what is known in the art as coalitional damping, which is a decrease in the ion's cyclotron radius due to a loss of kinetic energy through collisions of the ion with other ions, molecules, or atoms in the ICR cell. Ion de-phasing occurs when an ion cloud loses phase coherence. For example, ions with the same m/z can become distributed at varying cyclotron phase angles rather than remaining in a coherent ion packet. Ion de-phasing also reduces the magnitude of a detected signal. A number of different processes have been identified as contributing to de-phasing of ion clouds. For example, ion-cloud density, magnetic field strength, Coulombic interactions with other ion clouds, total cloud charge, magnetron motion, and ion velocity can have respective effects on de-phasing. Ion packets may become more stable as the number of charges in the ion packets increase, and such increased ion-cloud stability may reduce de-phasing.

Therefore, there is a need in the art for methods and apparatus that can improve performance of FTICR mass spectrometry systems through the minimization of the effects that lead to ion collisions and ion de-phasing.

SUMMARY

Embodiments of trapping cells comprising electrodes configured to manipulate the radial electric field are described herein. Also disclosed are methods for manipulating the radial electric field to enhance existing functions and introduce novel functionality to ICR cells.

In one embodiment, a trapping cell comprises electrodes that include first and second groups of multiple electrodes. The groups are positioned at respective first and second ends of the trapping cell. The electrodes of the groups are perpendicular to an axis of the cell and are axially separated from each other. In some embodiments, the first and second groups of electrodes each comprise multiple respective annular electrodes. The annular electrodes can be concentric ring electrodes. In some embodiments, the electrodes flatten the radial electric field in the cell. The flattened electric field exhibits a field-flattening parameter of less than about 0.1 V/(m-mm), such as less than about 0.05 V/(m-mm).

Embodiments of a method for generating a flattened radial electric field are also described herein. In one embodiment, voltages are applied to trapping electrodes of a trapping cell to flatten the radial electric field at a first radial position. Applying respective voltages to the trapping electrodes minimizes the radial component of the electric field at the first radial position. The method can include applying voltages to electrodes of the cell to excite trapped ions to travel along excited radii of motion at the first radial position. The method can also include modifying voltages applied to trapping electrodes of the cell to shift the first radial position to correspond to an ion radial position. In some embodiments, applying voltages comprises applying voltages to the trapping electrodes according to a pre-selected profile of electrode potentials. Applying voltages according to the selected potential profile can include applying voltages such that at least one pair of adjacent electrodes of the trapping electrodes has a potential difference that is not zero.

The foregoing and other objects, features, and advantages will become more apparent from the following detailed description, which proceeds with reference to the accompanying figures.

BRIEF DESCRIPTION OF THE DRAWINGS

In FIG. 6B the field profiles are functions of position along the z-axis for seven radial positions.

In FIG. 7B the field profiles are functions of position along the z-axis for four radial positions.

FIGS. 11A-11H are plots of observed cyclotron frequencies for various axial excitation pulse lengths ranging from 0.0 ms to 0.402 ms, obtained in Experiment 3. The applied dc potential for direct excitation of trapping motion is shown at the bottom of the figure. FIG. 11I is a plot of applied dc potential for excitation of the trapping motion.

DETAILED DESCRIPTION

Figure 1B:
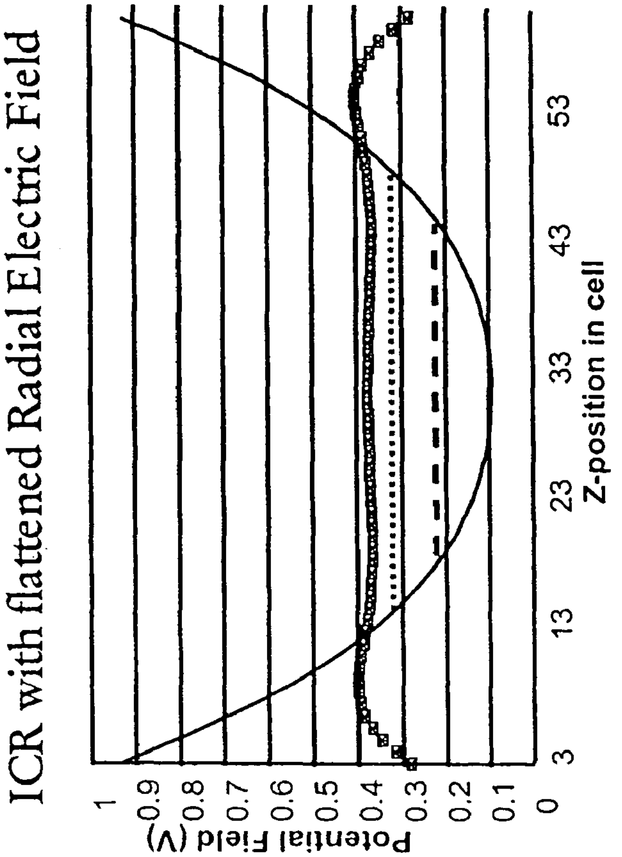
FIGS. 1A-1B are respective plots of radial and axial electric fields as a function of position on the z-axis for a conventional ICR cell (FIG. 1A) and for a cell with a flattened radial electric field (FIG. 1B). Exemplary kinetic energies of ions are plotted in each figure.

As used in this application and in the claims, the singular forms "a," "an," and "the" include the plural forms unless the context clearly dictates otherwise. The term "includes" means "comprises." The term "coupled" means mechanically, electrically, electromagnetically, or optically coupled or linked and does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular sequential order for convenient presentation, it should be understood that this manner of description encompasses rearrangement, unless a particular ordering is required by specific language set forth below. For example, operations described sequentially may in some cases be rearranged or performed concurrently. For the sake of simplicity, the attached figures may not show the various ways in which the disclosed systems, methods, and apparatus can be used in conjunction with other systems, methods, and apparatus. The description sometimes uses terms such as "produce" and "provide" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, and theoretical descriptions presented herein in reference to the apparatus and methods of this disclosure have been provided for the purposes of better understanding, and are not intended to be limiting in scope. The apparatus and methods in the appended claims are not limited to those apparatus and methods that function according to scientific principles and theoretical descriptions presented herein.

In general, a mass spectrum of a group of ions in an ion cyclotron resonance (ICR) cell or other ion-trapping cell can be generated using FTICR mass spectrometry through measurement of cyclotron frequencies of those ions. A typical ICR cell can include trapping, excitation, and detection electrodes configured to contain ions within a magnetic field and to detect frequencies of motion of the ions.

"Trapping electrodes" are generally configured to produce a trapping electric field for trapping or containing ions along the z-axis of a trapping cell or ICR cell. The z-axis in a trapping cell typically corresponds to an axis aligned with a magnetic field. In a cylindrically shaped trapping cell, the z-axis corresponds to a central longitudinal axis of the cell. The trapped ions can be considered to be trapped within a potential well generated by the trapping electrodes. Ions injected into a trapping cell typically have non-zero kinetic energies along the z-axis. As a result, ions trapped in potential well typically oscillate along the z-axis. These oscillations are characterized by an axial oscillation amplitude indicating a distance along the z-axis over which the trapped ions are oscillating. The amplitude of axial oscillation of an ion depends on the kinetic energy of the ion.

In addition to a trapping force and axial force, ions in the trapping cell typically also experience a non-zero radial force produced by the trapping electric field. For example, the electric field generated by trapping electrodes generally has a non-zero radial electric field (REF) component. A "radial electric field" is a portion of the electric field that is directed radially relative to the longitudinal axis. A radial electric field can correspond to an electrical field portion that extends perpendicularly relative to the longitudinal axis. For example, relative to the z-axis, the radial electric field extends in the x-y plane. A non-zero REF in a trapping cell exerts a radial force on ions in the cell that can induce "magnetron motion" of the ions. Increasing the REF strength tends to increase the frequency of magnetron motion for a given magnetic field strength. In general, magnetron motion can change the observed ion frequency, limit a critical mass that can be stored in an ICR cell, increase ion loss, reduce measurement sensitivity, and/or limit the resolution of FTICR-MS data. Therefore, the performance of a FTICR-MS system is improved through the application of the subject methods and apparatus for controlling magnetron motion of ions in an ICR cell by, e.g., controlling the radial electric field.

Disclosed herein are methods and apparatus for improving FTICR-MS performance that address disadvantages of conventional ICR cells and other FTICR-MS systems, in addition to providing other advantages.

Numerical and experimental analyses of FTICR-MS systems have revealed how ions in an ICR cell respond to changes in applied electric field(s) experienced by the ions in the cell and how FTICR-MS performance depends on such changes. ICR analysis, in general, is dependent on the shape of the electric field inside the ICR cell. Three types of electric-field shapes, and combinations thereof, are typically generated in ICR cells, including: two-dimensional RF electric fields, azimuthal quadrupolar RF electric fields, and three-dimensional axial quadrupolar electric fields. A spatially uniform two-dimensional RF electric field is typically preferred for ion excitation, an azimuthal quadrupolar RF electric field is typically preferred for ion axialization, and a three-dimensional axial quadrupolar electric field is typically preferred for ion axial confinement. In general, most ICR cell configurations embody a compromise among these electrical field shapes.

For a trapping cell providing an ideal three-dimensional axial quadrupolar electrostatic trapping potential, the observed cyclotron frequency should be substantially independent of cyclotron radius. However, the trapping electric field generated by a typical trapping cell is not ideal. Experiments have shown that, in conventional and in EPIC systems, there can be a strong relationship between the observed frequency and the cyclotron radius. The dependence of observed cyclotron frequency on ion radial position can be at least partially attributed to an induced magnetron frequency that depends on radial position. This relationship can also be at least partially attributed to a dependence of space-charge effects on cyclotron radius. For example, cyclotron radius can affect space-charge conditions in predominantly two different ways. First, since a trapping potential approximates a quadrupolar electric field, a z-axis oscillation path length decreases as the cyclotron radius gets smaller. Therefore, smaller cyclotron radii correspond to ions that are confined to a smaller space axially, which increases ion density, and thus space-charge conditions.

Second, ions having large cyclotron radii with different mass-to-charge ratios have greater spatial distributions in planes that are perpendicular to the magnetic field. Hence, at higher excitation voltage, correspondingly increased cyclotron radius leads to a decrease in space-charge effects, resulting from a partial dispersion of the ion packet having a larger cyclotron orbit. These space-charge effects reduce the accuracy of measurements requiring long periods of data-acquisition time, since the measured frequency changes with time. Such a time-based frequency shift may not be observed in all ICR applications because the acquisition time period may not be sufficiently long, or the ions may not stay in a cohesive cloud for a sufficient period of time.

Therefore, the observed cyclotron frequency depends upon changes in space-charge conditions and upon the REF, experienced by an ion, that depends on the radius of ion-cyclotron motion.

Most FTICR-MS measurements evaluate ion packets of a cloud of ions with identical m/z species and slightly different kinetic energies (and therefore different axial oscillation amplitudes) traversing an ICR cell. Hence, a population of ions all having the same m/z can experience an REF distribution, in which different ions in the population experience different respective local REF strengths depending upon respective locations of the ions in the cell. As a result, magnetron motion can vary within the ion cloud. When the ions in an ion packet have a spread of magnetron frequencies, dephasing effects can reduce the duration of the detected signal. If, for example, a radial electric field could be "flattened" at a particular radial position, then ions orbiting the z-axis at that radial position and oscillating along the z-axis would experience a radial field with a relatively constant magnitude. Such a field could narrow the spread of magnetron frequencies in an ion cloud and reduce the dependence of observed frequency on the amplitude of axial oscillation.

Figure 1A:
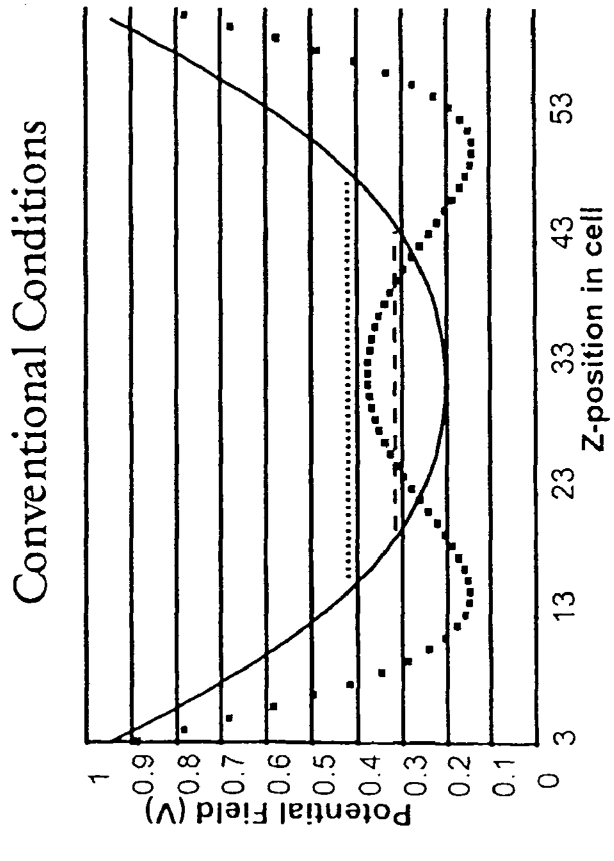

In FIGS. 1A and 1B, calculated radial and axial electric fields are plotted (versus z-axis position) for an ICR cell operated in a conventional manner (FIG. 1A) and for an ICR cell configured to flatten the radial electric field (FIG. 1B). Solid lines in both plots illustrate the axial potential experienced by an ion with a cyclotron radius that is 42% of the cell radius. In both plots, dotted and dashed lines within the potential wells indicate respective z-axis regions traversed by ions having approximately 0.2 eV and 0.1 eV, respectively, of axial kinetic energy. The trapped ions oscillate within the potential well defined by the axial potential and spend a majority of time at the endpoints of this oscillatory motion, that is, near the walls of the potential well.

The open squares in FIGS. 1A-1B are plots of the calculated radial electric field experienced by ions (at cyclotron radii that are 42% of the cell radius) at various z-axis positions in the ICR cell. Ions having differing z-axis kinetic energies (in this case, differing by 0.1 eV) can encounter significantly different radial electric fields in a conventional ICR cell when excited to the same cyclotron radius (in this case, 42% of the cell radius). However, these ions can encounter significantly similar radial electric fields when the radial electric field is flattened. Since magnetron motion depends on the radial electric field, and since a non-zero magnetron frequency reduces the observed cyclotron frequency, a narrower spread of experienced radial electric fields during detection of cyclotron motion can yield a narrower spread in observed cyclotron frequency. As a result, FTICR-MS performance is improved by flattening the radial electric field along the z-axis.

Because the radial electric field also depends on radial position, the observed frequency can vary over time. For example, as ions in an ICR cell spin on their excited cyclotron orbits, the ions typically collide with residual neutral molecules in the cell, which causes the cyclotron orbits of the ions to decrease over time. In systems in which the frequency of ion motion is dependent upon radial position in the ICR cell, ions should exhibit a shift in frequency as they damp toward the center of the ICR cell. This frequency shift is a result of a continually decreasing radius with time.

By modifying and controlling an electric field in an ICR cell using cell electrodes, improved FTICR-MS performance is achieved. For example, by decreasing variation in the radial electric field, variations in observed cyclotron frequency are reduced and the duration of the FID signal is increased, which improves resolution, accuracy of mass measurement, and sensitivity of FTICR mass spectrometry. Described herein are embodiments of novel methods and apparatus for dynamic control of the electric field produced in an ion-trapping cell such as an ICR cell. Conventional electron-promoted ion-coherence systems and ICR cells have certain disadvantages. Kaiser et al. (2005), "Observation of Increased Ion Cyclotron Resonance Signal Duration Through Electric Field Perturbations," *Anal. Chem.* 77:5973-5981; Kaiser et al. (2008), "Reduction of Axial Kinetic Energy Induced Perturbations on Observed Cyclotron Frequency," *J. Am. Soc. Mass Spectrom.* 19:467-478. The disclosed methods and apparatus address disadvantages of the conventional systems and provide other advantages as well.

In embodiments of a trapping cell with electric-field control, multiple groups of trapping electrodes are positioned in respective locations to define a trapping region in the cell and to generate an electric field for trapping ions in the trapping region along the axis. The trapping region can correspond to the volume of the ICR cell or other trapping cell, and the trapping region generally contains the trapped ions. Typically, the trapping region has a length that is at least twice the amplitude of axial oscillations of ions to be detected and is at least twice as wide as the excited propagation radius of the ions. The length axis can be the z-axis, which typically corresponds to the axis aligned with the magnetic field in the cell. In a cylindrically shaped trapping cell, the z-axis can correspond to the central longitudinal axis of the cylinder. Ions injected into a trapping cell typically have kinetic energies along the z-axis. The electric field in the trapping region can be dynamically modulated and controlled by changing respective voltages applied to the trapping electrodes. The applied voltages can be selected to modulate a component of the electric field that is radial relative to the axis or to minimize the radial component of the electric field at a given set or subset of radii.

The apparatus and methods described herein provide means for the active and dynamic control of the radial electric field (REF) within the ICR cell. The means enable a user to manipulate the forces experienced by ions within the cell during three principal phases of a typical experimental run: ion injection, ion excitation, and ion detection. The active manipulation of the forces exerted in the ICR cells yields significantly enhanced properties and new functionalities.

A "radial electric field" (REF) is the portion of an applied electric field in the cell that is directed radially relative to the axis of the cell along which the introduced ions have kinetic energy. In many embodiments, a flattened REF is desirable. A "flattened" REF exhibits changes or variations in the field along the "kinetic-energy" axis (such as the z-axis) that are small relative to distance along the kinetic-energy axis. In some examples, flattening the REF involves minimizing the change in the REF along a portion of the kinetic-energy axis. Hence, a flattened REF can correspond to a minimized REF along the z-axis. A flattened REF can also correspond to an electric field that is substantially parallel to the z-axis. Typically, a flattened REF is flattened along a portion of the z-axis length of the cell. The portion desirably corresponds to a region in which ion axial oscillations occur for the ions to be detected. For example, the REF can be flattened for a distance that is greater than about twice the amplitude of the ions' axial oscillations. An REF can be flattened at a particular radial position, for example a radial position corresponding to the excited radius of the ions. The REF can be tuned, according to technologies described herein, to minimize variations in the REF at radial positions corresponding to the excited radii of the ions.

A "field-flattening parameter" can be defined as the total change in magnitude of the REF divided by the distance along the z-axis over which the change is determined. For example, for an REF that varies over a 40-mm distance along the z-axis by a total of 1.25 V/m (wherein 1.25 V/m is the difference between a maximum magnitude and a minimum magnitude of the REF over the indicated portion of the z-axis), the field-flattening parameter is about 0.031 V/(m-mm). For embodiments described herein, the field-flattening parameter is generally less than about 0.10 V/(mmm). In some examples, the field-flattening parameter is less than about 0.08 V/(m-mm) while in other examples the field-flattening parameter is less than about 0.06 V/(m-mm), such as less than about 0.035 V/(m·mm).

The REF of an ICR cell contributes to magnetron motion of trapped ions, and such motion can degrade FTICR-MS performance. For example, the dependence of magnetron frequency (hence an observed frequency) on the amplitude of ion axial oscillations can result in reduced accuracy and resolution for FTICR-MS experiments (see Experiment 1, for example). In this regard, a flattened REF can improve FTICR-MS performance in several ways. For example, since the REF in a conventional ICR cell can vary along the z-axis of the ICR cell, magnetron motion can also vary as a function of z-position. By flattening the REF, this variation is reduced because the dependence of magnetron frequency on z-position is reduced. As a result, accuracy and resolution of the observed frequency are improved. Ions having the same m/z should produce the same observed frequency. However, ions having the same m/z but having different axial kinetic energies (i.e., different amplitudes of axial oscillation) experience a different average REF in a conventional ICR cell when the field is not flattened. Therefore, ions having the same m/z can have different magnetron frequencies and produce different observed frequencies, thereby reducing measurement accuracy using a conventional cell.

For a trap potential of one volt in a typical ICR cell, a 1-2 Hz change in observed frequency corresponds to a 9-18 ppm error for an m/z value of 1,000 for a typical FTICR instrument equipped with a 7-Tesla magnet. Ions not having similar axial kinetic energy from scan-to-scan will be associated with corresponding variations in the observed cyclotron frequency from scan-to-scan. By flattening the REF, ions having the same m/z but having different axial kinetic energies have similar magnetron frequencies and produce similar observed frequencies.

Similarly, ions in an ion cloud in a conventional ICR cell can exhibit a distribution of magnetron frequencies and hence produce a corresponding distribution of observed frequencies. By flattening the REF, ions in the cloud experience similar average radial forces, which narrows the respective distributions of magnetron frequencies and observed frequencies. In addition, the distribution of ion magnetron frequencies in an ion cloud contributes to dephasing, which reduces the duration of the observed time-domain signal. For example, for a distribution of magnetron frequencies of about 1-2 Hz, ions moving along the z-axis in the range of 2 to 38 mm can be 180° out of phase within 0.5-0.25 second, which generally agrees with experimental observations. By flattening the REF, these dephasing effects can be reduced to improve the duration of the signal. In general, magnetron motion can be reduced by minimizing the radial force on ions at a particular excited radius.

In disclosed embodiments of a trapping cell with electric-field control, multiple electrodes can be configured to flatten the radial electric field. The electrodes can include a respective group of electrodes situated at each longitudinal terminus of the trapping cell, wherein the electric field in the trapping cell can be controlled by applying respective voltages to each group of trapping electrodes. In a preferred embodiment, the multiple electrodes include respective groups of trapping electrodes disposed at each longitudinal terminus of the trapping cell, wherein the electric field in the trapping cell is controlled by applying respective voltages to the electrodes of each group. In general, the trapping electrodes are positioned such that ions are trapped between the groups of trapping electrodes. The groups of trapping electrodes can be situated perpendicularly to the cell axis and separated from each other along the axis (i.e., the groups are axially separated from each other). At least one pair of excitation electrodes and/or at least one pair of detection electrodes can be positioned between the longitudinal termini of the cell and between the groups of trapping electrodes.

In some embodiments, the trapping cell is cylindrically shaped, having an aspect ratio of about one (e.g., a cell 2 inches in diameter by 2 inches in length). In other embodiments the cell has other shapes such as square, oval, or rectangular. The trapping cell can have sizes and aspect ratios other than those specifically described herein. Typically, the size of the trapping cell allows the cell to be situated sufficiently within a magnetic field and within a FTICR-MS instrument. For example, ICR cells described herein are typically less than about one foot in length with a width ranging from about 2 millimeters to about six inches. Various instrumental trade-offs and experimental requirements can influence selection of size and aspect ratio of an ICR cell for a particular application. Hence, it will be understood that the subject cells are not limited to a particular size or aspect ratio.

The trapping electrodes, as well as excitation and detection electrodes, can vary in size and shape. For example, the electrodes can be rings, strips, discs, plates, or combinations thereof. The electrodes can be square, rectangular, curved, flat, or circular in shape, and described electrodes can be made up of smaller pieces. Annular electrodes include, for example, electrodes that are rectangular, square, circular, or ring-shaped. Annular electrodes can be concentric or non-concentric with each other. The electrodes can be arranged concentrically, spaced apart from, adjacent to, aligned with, or misaligned with other electrodes. The electrodes can vary in size, such as by having different respective widths and/or thicknesses. An electrode can be electrically, capacitively, or otherwise coupled to one or more other electrodes, and/or an electrode can be electrically insulated from one or more other electrodes. Electrodes can be individually connected to a voltage source such that respective electric potentials can be applied to individual electrodes. Electrodes can be connected to a voltage source using electrical connectors known in the art. For example, individual electrodes can be soldered or otherwise electrically coupled to wires connected to a voltage source. Disclosed electrodes can be configured to function as trapping electrodes, as excitation electrodes, as detection electrodes, or as combinations thereof.

In an embodiment of a cylindrically shaped ICR cell, a respective group of annular trapping electrodes is positioned at each longitudinal terminus of the cell. In each group the annular electrodes are ring-shaped. The electrodes are spaced apart from each other and arranged concentrically or positioned adjacent to other electrodes. The annular electrodes can be of variable width and/or thickness or of substantially equal width and/or thickness. The width and/or thickness of a particular annular electrode can be a function of the electrode's position in its group. For example, with a group of concentric ring electrodes, a central ring electrode can have a first width, and remaining ring electrodes arranged concentrically about the central ring electrode can have increasing or decreasing widths relative to the first width. The width of a ring electrode is measured in the radial direction.

In various embodiments, the electrodes are configured to operate in combination to trap ions along the longitudinal axis in the ICR cell and to modulate the electric field within the ICR cell. Preferably, a respective group of at least two electrodes are located at each longitudinal terminus of the cell and configured to control the electric field in the ICR cell. Advantageously, a respective group of more than two electrodes is positioned at each longitudinal terminus of the cell and configured to control the electric field in the ICR cell. In principle, a larger number of electrodes in each group allows for finer adjustment of the electric field. However, for a specific ICR cell, the maximum obtainable number of electrodes in a group may be limited by the size of the cell and the practicality of fabricating high-density electrode arrays.

Figure 2:
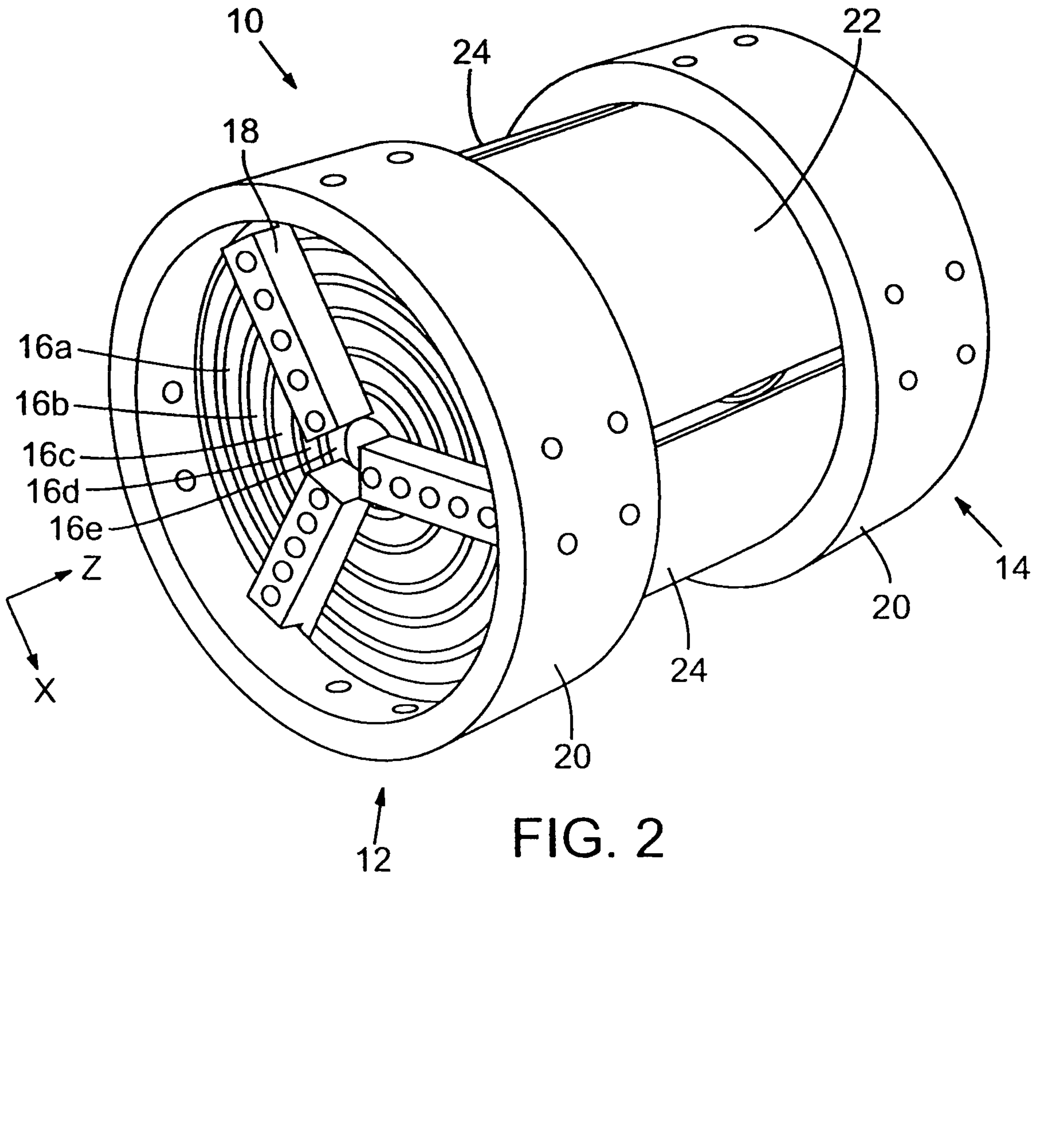
FIG. 2 is a perspective view of a trapping ring electrode cell (TREC).
Figure 4:
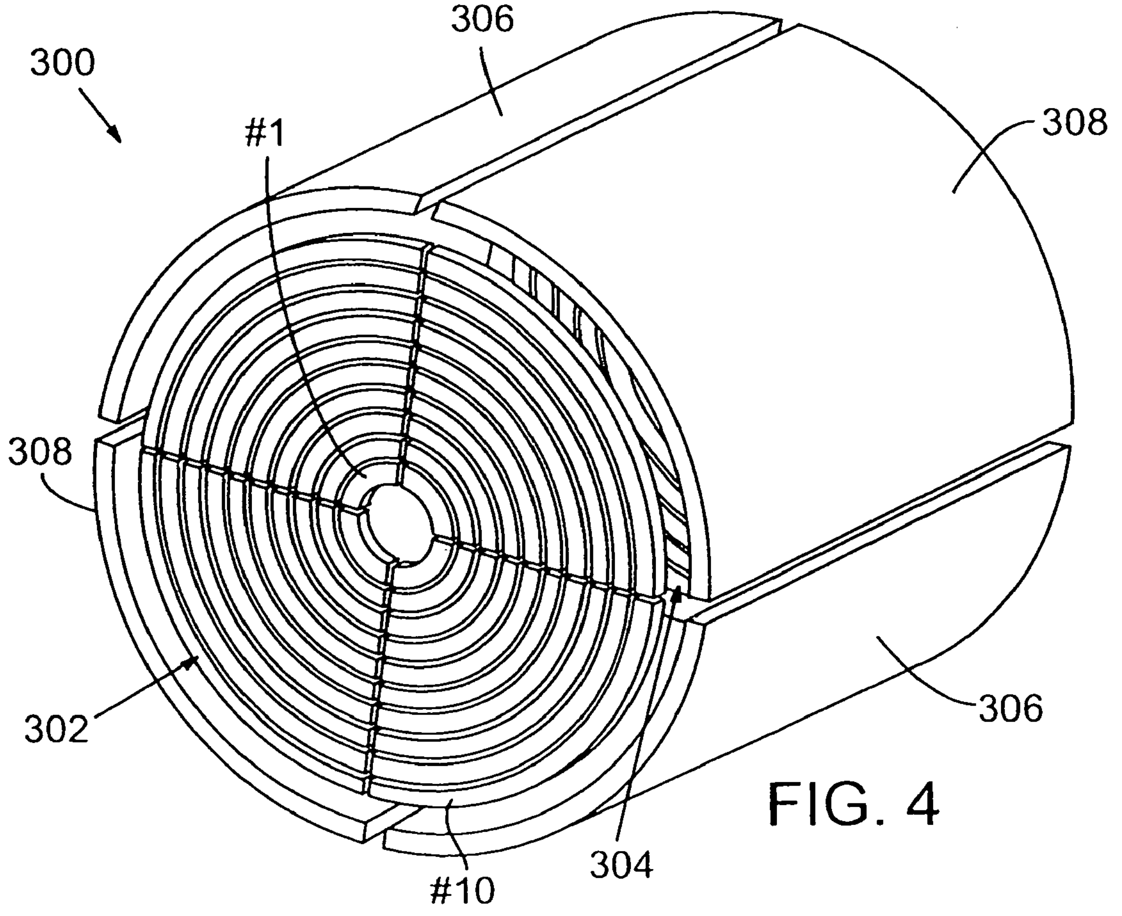
FIG. 4 is a perspective view, respectively, of an embodiment of a TREC.

Respective embodiments of a trapping ring electrode cell (TREC) are shown in FIGS. 2 and 4. In general, a TREC is a cylindrically shaped ICR cell having respective groups of multiple concentric ring-shaped trapping electrodes located at each longitudinal terminus of the cell. The ring electrodes are configured to control, at least partially, the electric field within the cell. The ring electrodes desirably are electrically coupled to voltage sources providing respective voltages to each electrode or to multiple electrodes in a group. The voltages desirably are independently controlled. One or more individual electrodes can be capacitively or otherwise coupled.

FIG. 2 shows a TREC 10 having a first z-axis terminal end 12 and a second z-axis terminal end 14. Visible on the first z-axis terminal end 12 is a respective group of five concentrically arranged, ring-shaped trapping electrodes 16*a*-16*e*. A similar respective group of trapping electrodes is situated on the second z-axis terminal end 14. The trapping electrodes 16*a*-16*e* are mounted to radial bars 18 of a dielectric material and surrounded by a collar 20. The same structure is on the opposite end 14. In the space between the ends 12, 14 are an opposing pair of excitation electrodes 22 and an opposing pair of detection electrodes 24. The excitation electrodes 22, detection electrodes 24, and trapping electrodes 16 collectively define a cylindrical space serving as the ICR cell. Each group of ring-shaped trapping electrodes 16 is oriented perpendicularly to the longitudinal axis (z-axis) of the cell, and the trapping electrodes in each group are radially separated from each other in a concentric manner. The two groups are axially separated from each other along the z-axis. The electrodes 16, 22, 24 shown in FIG. 2 are individually electrically coupled to respective voltage sources.

Figure 3:
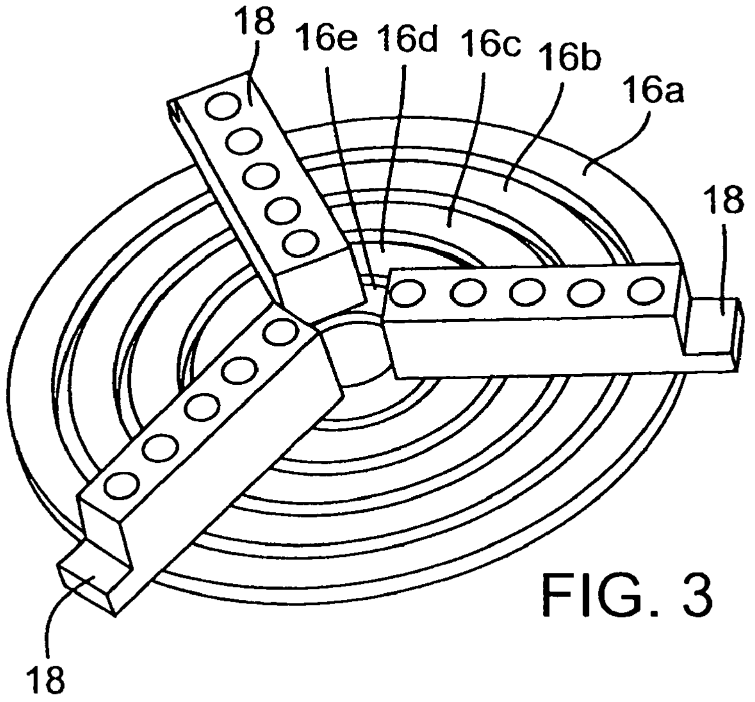
FIG. 3 is a perspective view of one group of trapping electrodes in the embodiment of FIG. 2.

FIG. 3 is an end perspective view of the concentrically arranged, ring-shaped trapping electrodes 16*a*-16*e* of the FIG. 2 embodiment of a TREC. FIG. 3 shows that the thickness of each of the ring electrodes is small relative to the diameter of the ICR cell, while the width of each of the ring electrodes is substantially equal. In other embodiments of a TREC, the ring electrodes have variable thicknesses and widths.

FIG. 4 is a perspective view of a TREC 300 comprising respective groups 302, 304 of ring-shaped trapping electrodes on each end. The trapping electrodes of each group 302, 304 are concentric, ring-shaped electrodes. The TREC 300 also comprises detection and excitation electrodes 306, 308, respectively, located between the groups 302, 304 of trapping electrodes. The groups 302, 204 of trapping electrodes, together with the opposing pair of detection electrodes 306 and opposing pair of excitation electrodes define a cylindrical ICR cell. The detection and excitation electrodes 306, 308 in this embodiment are formed as respective curved plates. Each group 302, 304 of trapping electrodes includes ten respective concentric ring electrodes that are consecutively numbered for convenience, beginning at the inner electrode (electrodes #1 and #10 are specifically labeled in the drawing). In other embodiments the ring electrodes have relative widths that are different from those in FIG. 4. For example, certain other TREC embodiments comprise multiple trapping electrodes in each group, wherein the electrodes have variable widths such as increasing or decreasing width as a function of electrode number.

Embodiments of trapping cells described herein can be configured and operated in various ways to produce various electric field shapes. The shape of the electric field in a trapping cell can be modified and controlled based on voltages applied to particularly to the trapping electrodes of the cell. For example, the electric-field shape in a TREC can be controlled (and controllably changed) by modifying respective voltages applied to the respective ring electrodes of each group of trapping electrodes located at the cell termini. In general, the respective voltages applied to the trapping electrodes can be defined according to a predetermined profile of electrode potential. An electrode-potential profile is effectively a list of voltages and corresponding electrodes to which the voltages are applied. The voltages applied to individual electrodes can be different, or equal voltages can be applied to more than one electrode. The electrodes desirably are numbered to facilitate application of the electrode-potential profile. The electrode-potential profile alternatively is a plot of voltages versus respective electrode identifiers such as electrode number or position. The shape of the electric field in the trapping cell can be selected by applying the appropriate electrode-potential profile to the trapping electrodes. The same or different electrode-potential profiles can be applied to the trapping electrodes of each group thereof.

Figure 16:
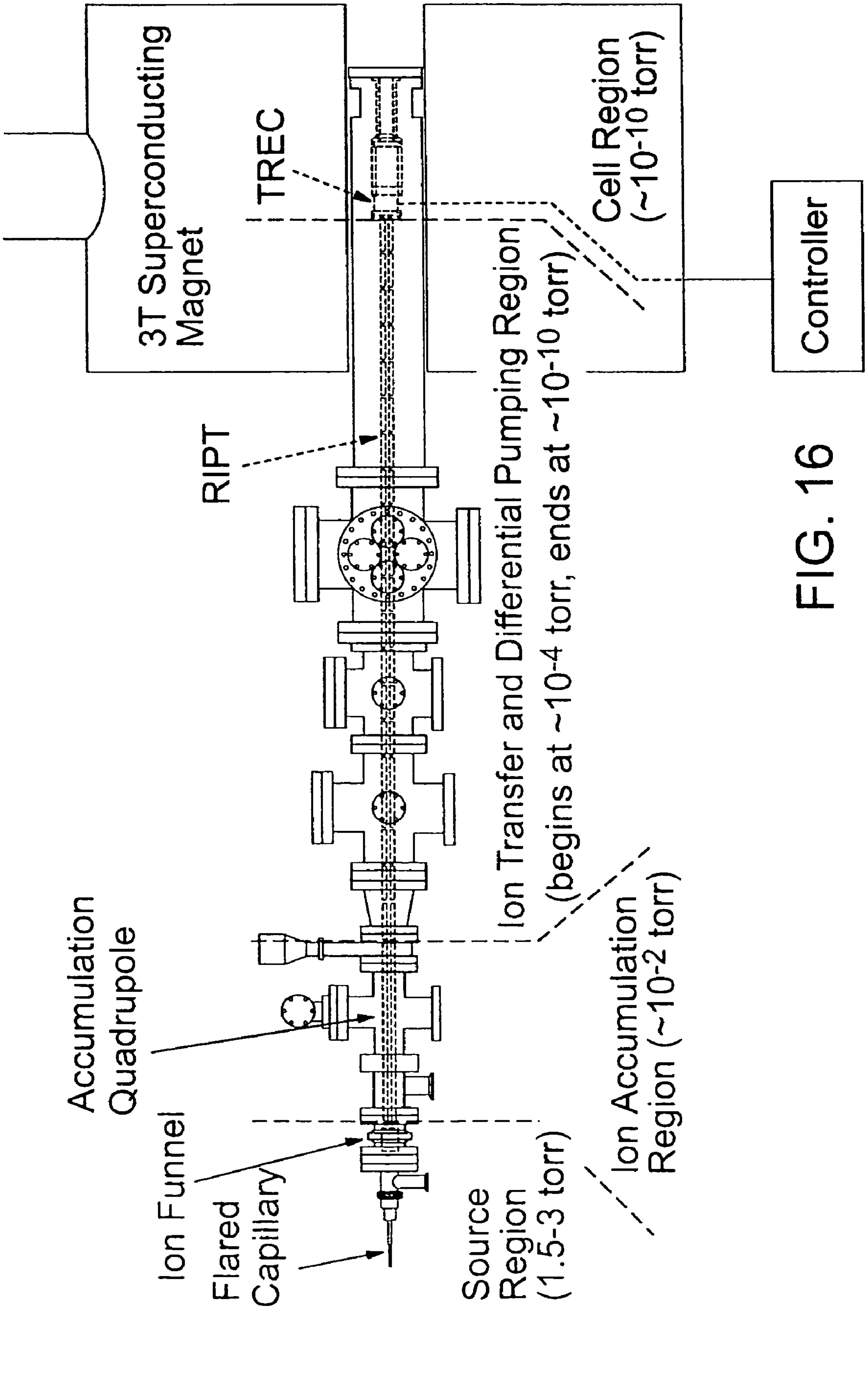
FIG. 16 is a diagram of an embodiment of a mass-analysis system comprising a TREC.

FIG. 16 is a diagram of an embodiment of a mass-analysis system including a TREC as described herein. Beginning at the left end is a source region, normally maintained at a vacuum level of 1.5 to 3 Torr. The source region includes a flared capillary at which a sample is introduced for analysis, and an ion funnel. The next region is the ion-accumulation region normally maintained at a vacuum level of approximately $10^{-2}$ Torr. The ion-accumulation region includes an accumulation quadrupole in this embodiment. The next region is the ion-transfer and differential-pumping region normally maintained at a vacuum level of approximately $10^{-4}$ Torr (on left, or entrance, end) and approximately $10^{-10}$ Torr (on right, or exit, end). This region includes a RIPT (restrained ion population transfer) device that extends between the poles of a 3T superconducting magnet. Also located in the magnet is the TREC, situated in the cell region, normally maintained at a vacuum level of approximately $10^{-10}$ Torr. The TREC is electrically connected to a controller that provides respective voltages to the trapping electrodes, detection electrodes, and excitation electrodes of the TREC. The downstream configuration of the system is that of a corresponding portion of a conventional FTICR-MS system.

Figure 5B:
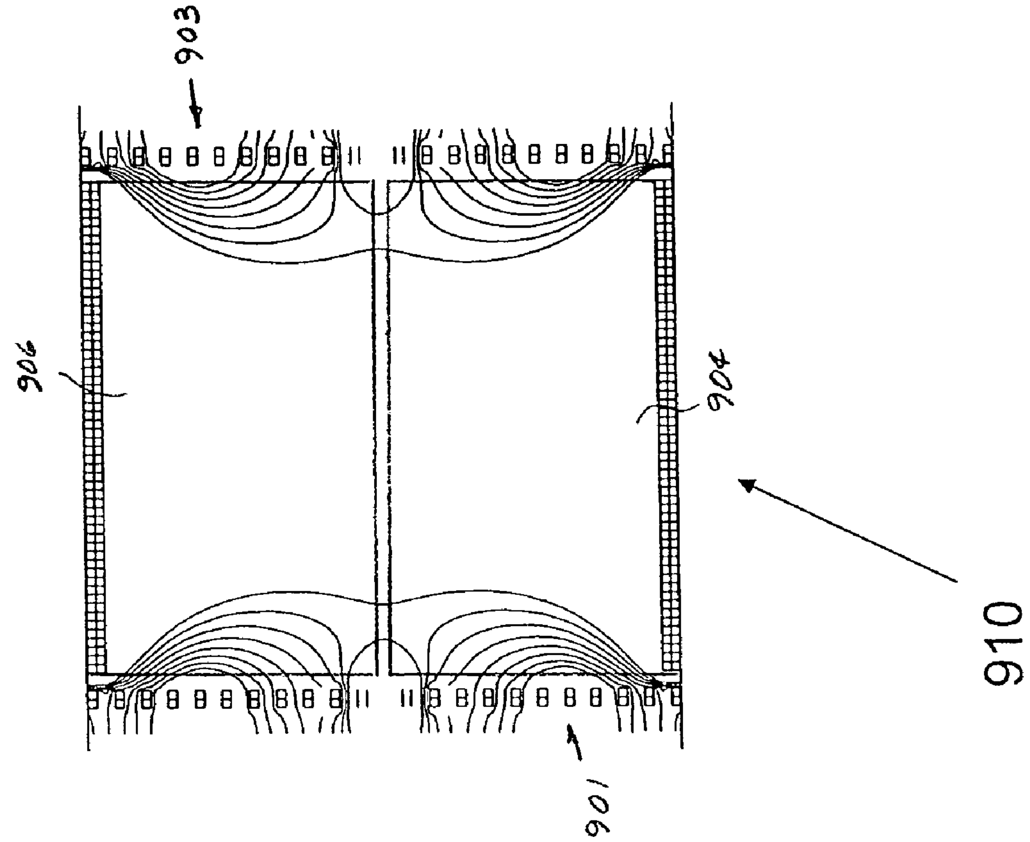
FIGS. 5A-5B are respective x-z planar sections of a TREC with equipotential contour lines representative of an electric field when the cell is configured to operate in a constant-potential mode (FIG. 5A) and in a non-constant potential (or TREC) mode (FIG. 5B).
Figure 5A:
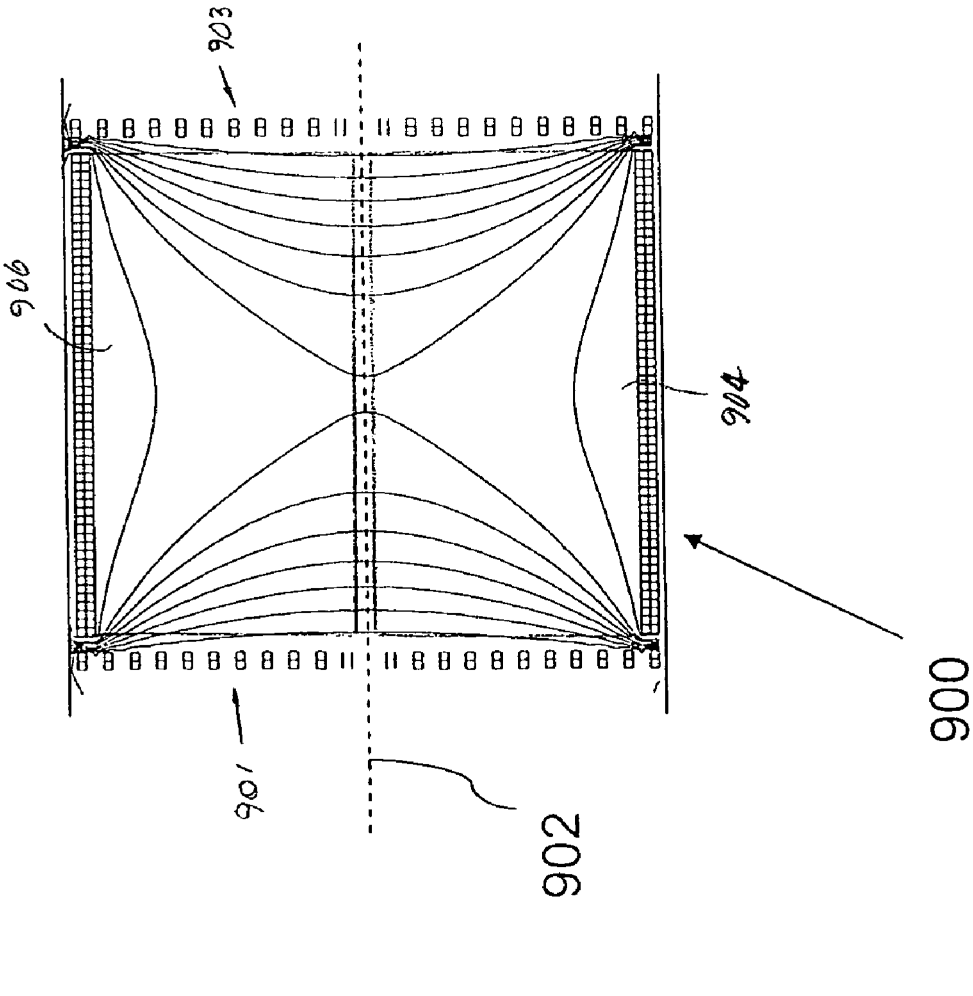

FIGS. 5A-5B show respective sectional views along an x-z plane of TREC embodiments 900 and 910, respectively. Each TREC has respective groups 901, 903 of eleven ring-shaped trapping electrodes located at each longitudinal terminus of the cell. The z-axis 902 (FIG. 5A) represents the central, longitudinal axis of the cell. Excitation electrodes 904 and detection electrodes 906 are situated along the cylindrical wall between the longitudinal termini. SIMION simulations were used to delineate an electric field in the cells 900 and 910 as different potential profiles were being applied to the ring-shaped trapping electrodes. FIG. 5A illustrates calculated equipotential contour lines for the cell 900 operating with 1 V being applied to all the trapping electrodes of both groups 901, 903 (i.e., the TREC 900 is operating in a "constant-potential" mode). FIG. 5B shows the cell 910 operating with a linearly varying profile of electrode potential, in which 0 V is applied to the outer trapping electrodes of each group, and 1 V is applied to the middle electrode of each group, with a linear progression of applied voltages to the other electrodes in each group.

The effect of applying a non-constant profile of electrode potential to the trapping electrodes of a TREC is demonstrated by comparing the equipotential contour lines of cell 900 (FIG. 5A) to those of cell 910 (FIG. 5B). In general, operation of the TREC cell in a constant-potential mode (i.e., a "non-TREC" mode) can indicate the performance of a conventional ICR cell such as an ICR cell having a single trapping-electrode plate positioned at each terminus of the cell. When compared to cell 900, the cell 910 exhibits a significantly reduced variation of radial electric field along the z-axis at selected cell radii. Such a "flattened" electric field is illustrated in FIG. 1B for a particular cell radius.

Figure 6A:
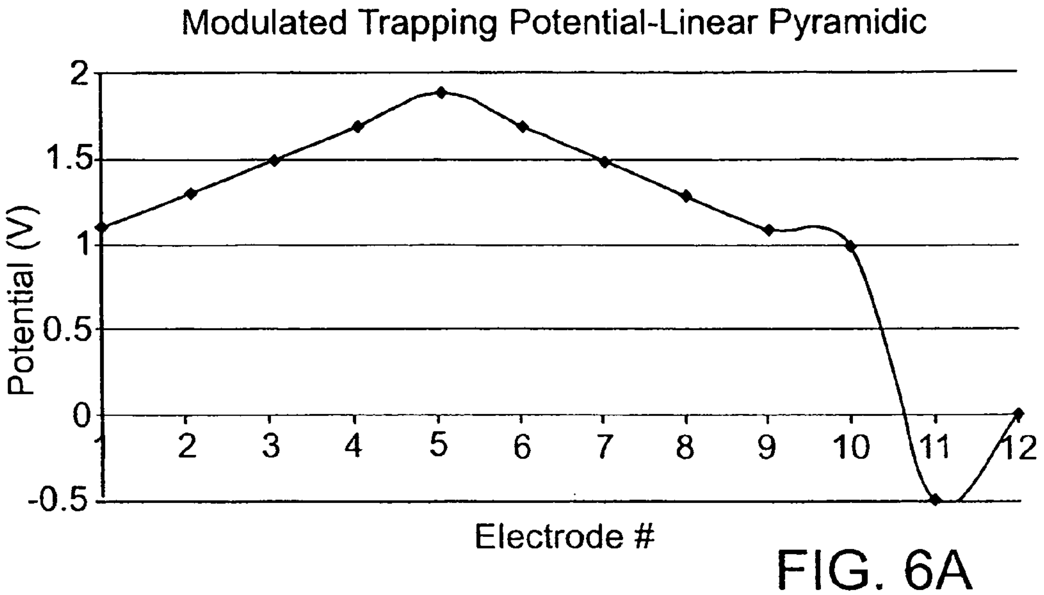
FIG. 6A is a plot of an exemplary linear, pyramidic profile of electrode potential.
Figure 6B:
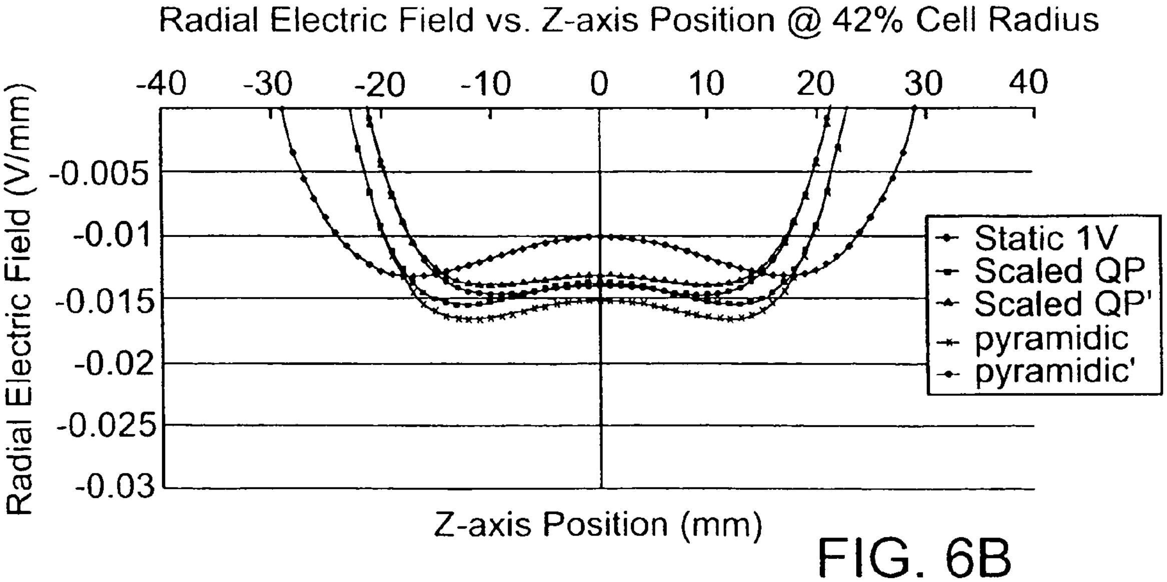
FIG. 6B is a plot of the resulting radial electric field when the profile of FIG. 6A is applied to a TREC.

FIG. 6A is a plot of a profile of electrode potential that is linear pyramidic. FIG. 6B is a plot of the resulting radial electric field (REF) when the profile of FIG. 6A is applied to a TREC comprising two groups of eleven concentric, ring-shaped trapping electrodes. In FIG. 6B the REF is plotted as a function of position along the z-axis for seven radial positions that are denoted by respective distances (0-30 mm) from the z-axis ("off axis"). As shown in FIG. 6B, applying the potential profile of FIG. 6A to the trapping electrodes of each group flattens the radial electric field over a range of z-positions and at more than one radial position.

Figure 7A:
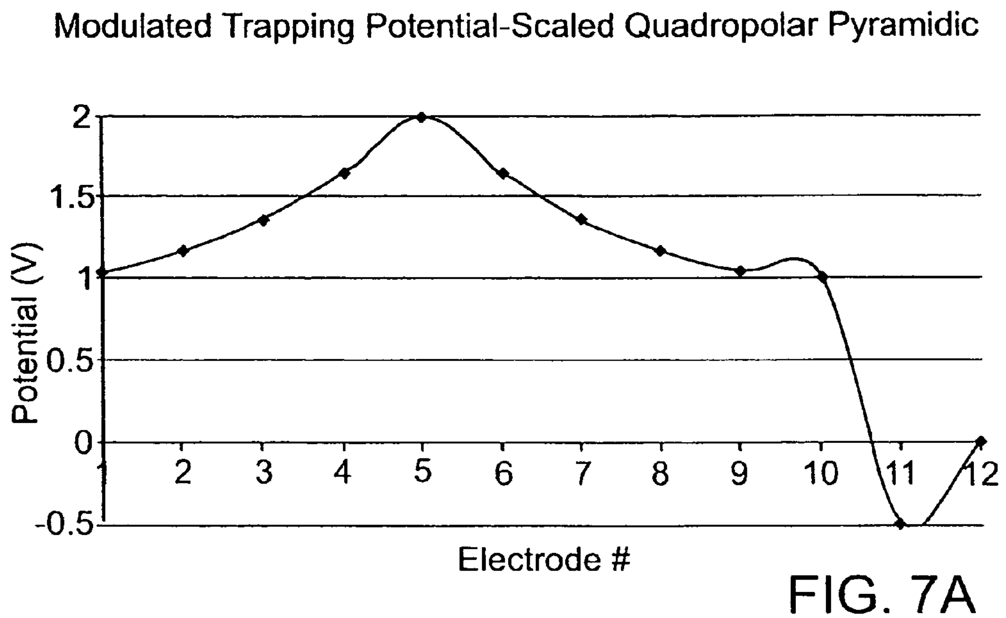
FIG. 7A is a plot of an exemplary quadrupolar, pyramidic profile of electrode potential.
Figure 7B:
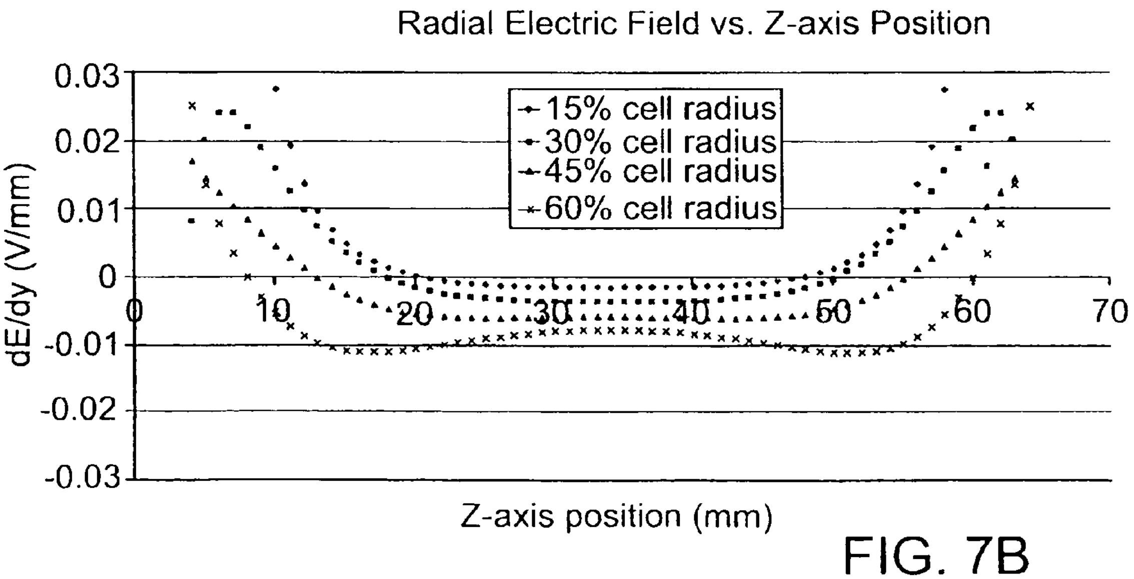
FIG. 7B is a plot of the resulting radial electric field when the profile of FIG. 7A is applied to a TREC.

FIG. 7A is a plot of a profile of electrode potential that is quadrupolar pyramidic. FIG. 7B is a plot of the resulting REF when the profile of FIG. 7A is applied to a TREC comprising two groups of eleven concentric, ring-shaped trapping electrodes. In FIG. 7B the REF is plotted as a function of position along the z-axis for four radial positions that are denoted by comparison with the cell radius (15% to 60% cell radius). As shown in FIG. 7B, applying the potential profile of FIG. 7A to the trapping electrodes of each group flattened the REF in a "customized" manner over a range of z-positions and at more than one radial position.

Figure 8:
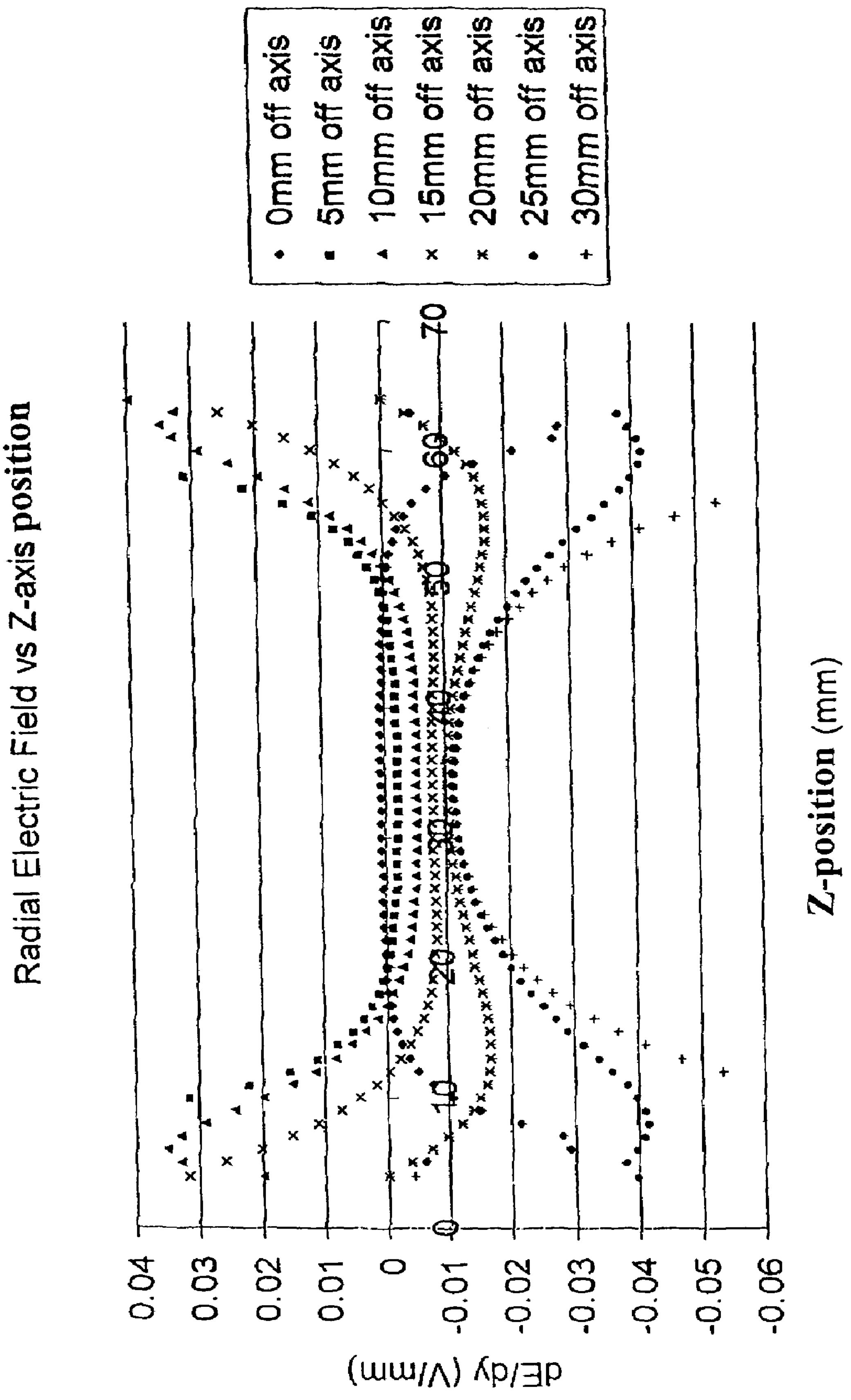
FIG. 8 is a plot of radial electric field as a function of position along the z-axis, at a radial position of 42% of the cell radius, produced when five different profiles of electrode potential are applied to the electrodes of a TREC.

FIG. 8 is a plot of REF as a function of position along the z-axis at a radial position that is 42% of the cell radius. The plots are of respective radial fields produced when five different profiles of electrode potential were applied to each group of eleven concentric, ring-shaped trapping electrodes of a TREC. FIG. 8 shows that the REF at a particular radius can be "tuned" by changing the potential profile applied to the trapping electrodes, and that a particular field shape is not limited to a particular radius. For example, for a particular TREC, the REF can be flattened at potentially many different radial positions. Such control is particularly suitable for FTICR-MS systems in view of different ions having different orbital radii within the cell. Potential profiles described herein are example potential profiles and are not intended to be limiting in any way.

Embodiments of ICR cells described herein can be operated in various ways such that the REF shape is modified and controlled as desired during various stages of a FTICR-MS experiment. The REF in the ICR cell can be tuned to increase the length and/or resolution of the detected signal. The REF can also be modified variably as a function of time. For example, FTICR-MS experiments can be considered as having at least three stages: trapping, excitation, and detection. A FTICR-MS experiment can include trapping ions in an ICR cell, exciting trapped ions to amplified cyclotron orbital motions, and/or detecting orbital motions of ions by image-current measurements. The REF in the ICR cell can be modified, controlled, and tuned between and/or during one or more stages of an FTICR-MS experiment to manipulate and optimize ion behavior in various ways according to the needs at each stage.

In some examples, the groups of multiple trapping electrodes of an ICR cell can be configured to modify the electric field being experienced by ions during excitation. In a typical ICR cell, at least one pair of excitation electrodes is disposed, opposite each other, along the wall of the ICR cell between the trapping electrodes. The excitation electrodes can be small and local, longitudinally extended, and/or have significant radial width. The potential applied to the excitation electrodes has a periodicity corresponding to the cyclotron frequency of ions within the cell. The resulting periodic electric field amplifies the cyclotron motion of the ions. With amplification of the cyclotron motion, the ions' radii of cyclotron orbit increase. For excitation electrodes extending the full longitudinal length of the cell, the electric field produced by them has a parabolic shape with an inflection point situated approximately at the center of the cell. Ions experience excitation pulses within this parabolic-shaped field, in which the intensity of the pulse depends upon the z-axis position of the ions within the ICR cell. As a result, ions in the cell having respective kinetic energies in a range thereof produce a corresponding distribution of signal intensities during detection. By capacitively coupling the trapping electrodes, such as the concentric, ring-shaped trapping electrodes of a TREC, to the excitation electrodes, the trapping electrodes can be used for modifying the excitation electric field within the ICR cell. For example, the excitation electric field in the cell can be "linearized" to be substantially perpendicular to the excitation electrodes and to be substantially uniform and linear between the excitation electrodes. With a linearized excitation field, the excitation pulse experienced by an ion is less dependent on its z-axis position, which allows the distribution of signal intensities to be narrowed.

In some examples, the trapping electrodes of an ICR cell can be configured to modify an electric field generated in the cell during detection. For example, ions can be injected into the ICR cell (e.g., a TREC) and excited into cyclotron motion in the cell. During excitation, the ICR cell may be operated in a manner similar to a conventional cell, or the ICR cell may be operated while the excitation electric field is modified. As ions are being excited to a sufficiently large cyclotron orbital radius corresponding to the excited radius, a customized profile of potentials can be applied to the trapping electrodes. The profile can be selected such that the REF is flattened at radial positions corresponding to the excited radius. In this manner, the dependence of the magnetron motion (induced by the REF) on the z-axis positions of the ions can be reduced so that ions having different z-axis kinetic energies will experience similar average radial forces. This manner of operation also can reduce dephasing effects resulting from magnetron motion of the ions in ion packets; reducing dephasing effects can increase signal duration.

In some examples, the trapping electrodes of an ICR cell (e.g., a TREC) can be configured to control the position of an inflection point of an electric field as a result of modifying the electric field. For example, during detection, ion dephasing and collisional damping are two phenomena that reduce signal duration. At the inflection point of an REF in the cell, the radial force that induces magnetron motion is minimized. Therefore, changing the position of the field-inflection point, so that ions orbiting at an excited radius experience minimal radial force (and hence minimal magnetron motion), can improve signal duration. An ion's orbital radius can decrease with time due to collisional damping. Changing the radial position of the field-inflection point as a function of time (e.g., in a manner corresponding to the radial decay of the orbital radii of the ions) can also improve signal duration. The position of the field-inflection point can be changed by, for example, changing the profile of applied potential to the electrodes.

The respective groups of trapping electrodes at each longitudinal terminus of an ICR cell also can be configured to modify the electric field in the cell during ion injection. For example, by generating an REF in the ICR cell prior to exciting the ions, ions can be induced into magnetron motion. This inducement increases the storage capacity of the ICR cell, which facilitates collecting and detecting low-abundance species. In another example, the REF in an ICR cell can be customized to generate a force urging ions toward the center of the cell, thereby narrowing the distribution of kinetic energies of the ions.

In additional examples, the REF in an ICR cell can be modified during isolation and fragmentation stages of a FTICR-MS measurement to select ions and/or ionic fragments of interest and/or to eliminate ions or ionic fragments that otherwise would cloud analytical results. For example, outwardly directed REFs promote expansion of the magnetron radius during collisional cooling of ions. Expansion of the magnetron radius is a significant ion-loss mechanism typically encountered during extended high-pressure ($10^{-4}$ Torr) experiments including trapping of accumulated ions. These losses conventionally can be difficult to prevent. By applying an appropriate potential profile to the multiple trapping electrodes of the ICR cell, an inwardly directed REF can be produced that mitigates collisionally-induced increases of magnetron radii, thereby reducing ion loss.

Methods and apparatus for modifying the electric field in a trapping cell, as described herein, can be combined with and/or used in addition to or in combination with other methods and apparatus.

EXPERIMENT 1

Ions were analyzed using a Bruker Daltonics 7T ApexQ FTICR mass spectrometer (Billerica, Mass.). Ions were produced by electrospray ionization, produced by applying about 2.5 kV to the input of the mass spectrometer. The electrospray solution was 49:49:2 (v/v) water:methanol:acetic acid. An infinity cell ICR cell was utilized for image-current detection, and mass-spectral data were acquired using "Xmass" version 7.0.6 as the data-acquisition software. (The infinity cell is a commercially available ICR cell that was used to produce baseline data to which data obtained using the TREC cell were compared.) The peptides bradykinin, melittin, and insulin were obtained from Sigma (St. Louis, Mo.). 10 μM solutions of the peptides were infused at 0.4 μL/min by direct injection using a syringe pump. Ions were accumulated in a hexapole ion guide following isolation with a mass-selective quadrupole. Ion intensity was varied by changing the ion-accumulation time in the hexapole. The accumulation time varied between 0.1 ms and 2.0 s. Collected data were analyzed with ICR-2LS, a custom data-processing software publicly available from Pacific Northwest National Laboratories (http://omics.pnl.gov/software/ICR2LS.php). To determine frequencies, all transients were Welch apodized followed by one zero-fill before Fourier transforming the data to the frequency domain. (Apodization and zero-filling are standard ICR data-processing steps. Apodization involves de-enhancing the sharp transitions at the beginning and end of the time domain signals to reduce Gibbs oscillations in the frequency domain, whereas zero-filling interpolates points in the frequency domain for smoother appearing peaks.) Ion abundances used for making corrections to space-charge frequency were calculated from the initial amplitudes of the extracted transient of the mono-isotopic peak in the frequency domain.

Kinetic energies of the ions were varied to observe effects of axial-oscillation amplitude on observed cyclotron frequency. Ions were cooled either by a pulsed-gas event or by the addition of a significant delay between ion injection into the ICR cell and ion excitation. Three sets of data plotted in FIG. 9 exhibit the effects of various delays on observed frequency. The highest observed cyclotron frequency occurred in all data sets after the ions had been cooled to the middle of the ICR cell. Data set (o) was obtained from an experiment investigating the relationship between observed frequency and the duration of time between a pulsed-gas event occurring after ion injection and cyclotron excitation. Increasing this time period showed no noticeable trend in measured cyclotron frequencies. Thus, ions appear to have been cooled axially to the middle of the ICR cell. No time points were taken with a delay of two seconds or less due to the deleterious effects of high pressure on ICR signal detection. This delay period had no observable effect on the axial position of the ions.

Figure 9:
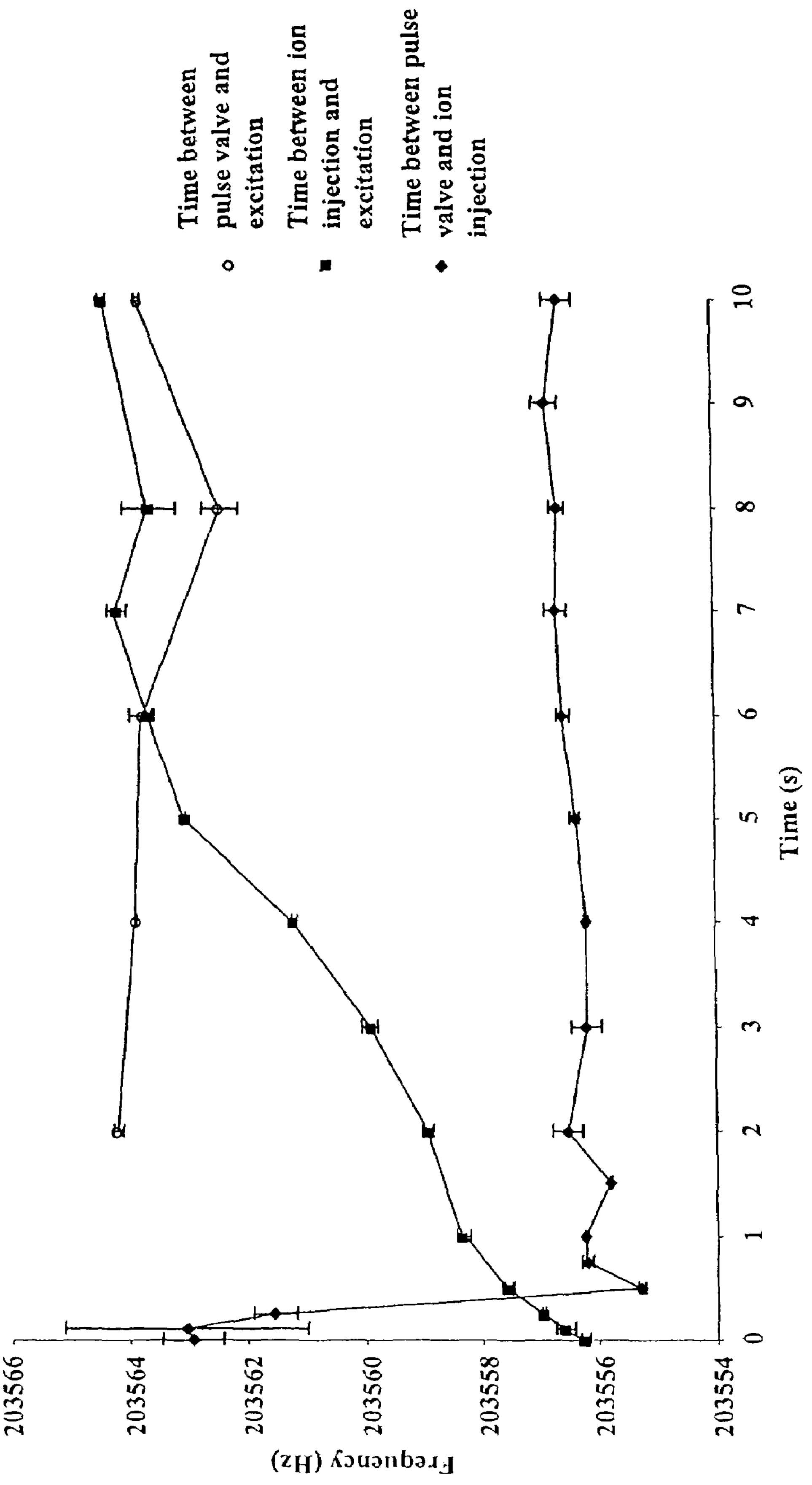
FIG. 9 is a plot of observed frequency versus time for time-delays of various lengths, obtained in Experiment 1.

Data set (■) of FIG. 9 was obtained from an experiment examining the effect on observed frequency on varying the time delay between ion injection into the ICR cell and the onset of cyclotron excitation, with no pulsed-gas event. With a delay of approximately 10 μs between ion injection and excitation, the ions had the lowest observed frequency. This indicated that these ions have the largest axial motion immediately after ion injection. As the delay period was increased, the observed frequency increased, which was attributed to ions cooling to the middle of the ICR cell by ion-neutral or ion-ion interactions. The signal amplitude remained constant for each delay period, indicating that ions were not lost from the ICR cell during the delay period. Hence, the observed change in frequency is attributable to change in axial position, rather than to alterations in space-charge conditions. After a delay of approximately seven seconds, the observed frequency leveled off at the frequency one would expect if the ions were cooled to the center of the ICR cell with the addition of a cooling gas. The data set indicates that, after a set time period, the amplitudes of axial oscillations of the ions were not further reduced. Also, the axial amplitudes of the ions resulting from delay between ion injection and ion excitation are similar to the axial amplitudes of the ions following a pulsed-gas event.

Similar experiments were performed with melittin and insulin to test for mass-dependence of the observations of axial relaxation. All three tested species (bradykinin, melittin, and insulin) exhibited the same trend of increasing frequency with increasing time delay before leveling off at respective observed frequencies agreeing with those recorded during corresponding pulsed-gas events.

Data set (♦) of FIG. 9 was obtained in experiments in which a pulsed-gas event was followed by a variable time delay before injecting the ions into the ICR cell. When the pulsed-gas event was followed immediately by ion injection, neutral molecules in the ICR cell cooled the ions to a level similar to a level exhibited when the ions were trapped and cooled with a pulsed-gas event. This is evident from the data in FIG. 9, since measured frequencies with a delay period of 0.5 seconds or less agreed closely with measured frequencies for cooled ions in data set (o) of FIG. 9. With a delay period of less than two seconds between the pulsed-gas event and ion injection, an additional delay was added so that the total time between the gas pulse and onset of cyclotron excitation was greater than two seconds. This allowed for residual neutral molecules to be pumped away.

As the delay period between the pulsed-gas event and ion injection was increased, the observed frequency decreased. This observation was attributed to neutral gas molecules being pumped away. Hence, when ions reached the ICR cell there were insufficient ion-neutral collisions to promote complete cooling of the axial motions of the ions. Delays of one second or longer produced observed frequencies that closely agreed with the frequencies obtained without a pulsed-gas event (data set (■) in FIG. 9). The data sets in FIG. 9 show that the degree to which ions are cooled changes the axial amplitudes of the ion oscillations and thus their observed frequencies. Therefore, a relationship exits between observed frequency and the amplitudes of the axial oscillations.

EXPERIMENT 2

Figure 10A:
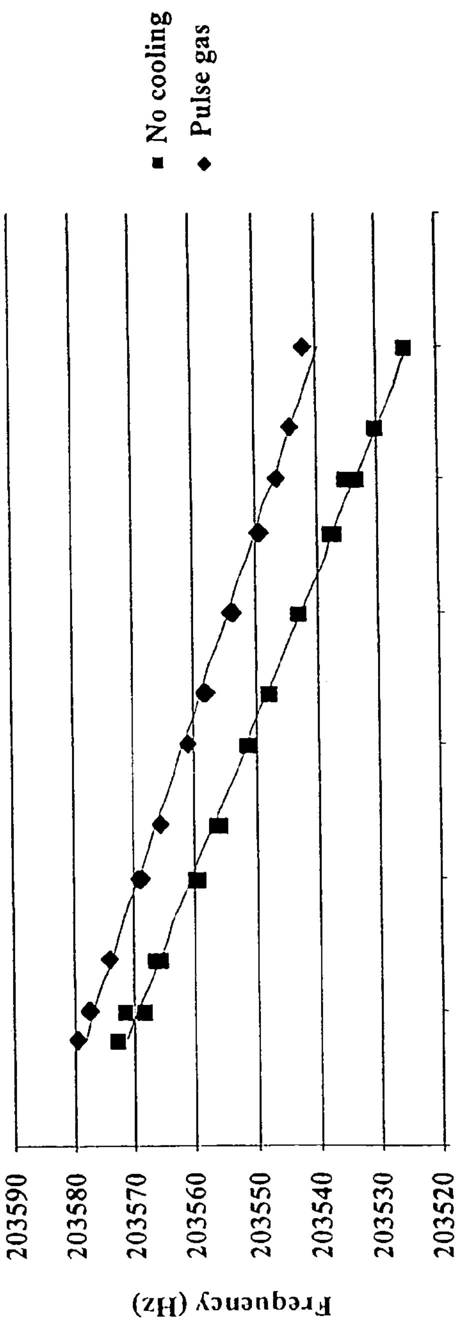
FIG. 10A is a plot of observed frequency.

Magnetron frequency was determined experimentally for both pulsed-gas and non-pulsed gas experiments by reducing the potentials of the trapping electrodes from 3.0 V to 0.5 V. By changing the potentials applied to the trapping electrodes, the REF driving the magnetron motion of the ions can be changed. For example, increasing the potential applied to the trapping electrodes increased the radial force experienced by the ions, which resulted in higher magnetron frequencies. Observed frequency is plotted versus trapping-electrode potential for experiments with (FIG. 10A) and without (FIG. 10B) pulsed-gas events. In FIG. 10A, the difference between observed frequency for pulsed-gas experiments and observed frequency for non-pulsed gas experiments increased with increases in trapping-electrode potential. The observed cyclotron frequency in experiments without pulsed-gas events decreased (as trapping potentials were increased) at a greater rate than in experiments with a pulsed-gas event. This trend indicated that REFs change more at greater z-axis positions with increased trapping-electrode potential. A y-intercept from the line in FIG. 10A is the cyclotron frequency observed with 0 V being applied to the trapping electrodes (unperturbed cyclotron frequency). With 0 V applied to the trapping electrodes, the ions do not experience any radial fields, which should reveal no magnetron motion. A difference between the y-intercept and the observed cyclotron frequency can be attributed to magnetron frequency in the absence of space-charge conditions.

Differences in ion intensity at the different trapping-plate potentials were corrected using a method developed by Easterling et al., *Anal. Chem.* 71:624-632 (1999). Separate calibration curves of ion intensity were constructed for the pulsed-gas and non-pulsed-gas experiments. Each frequency was corrected by adding a correcting shift (based on ion intensity) to obtain a frequency with minimal space-charge conditions. The reported frequencies in FIG. 10A are the approximate frequencies obtained at each trapping-plate potential in the absence of space-charge conditions. All experiments were performed in duplicate.

Figure 10B:
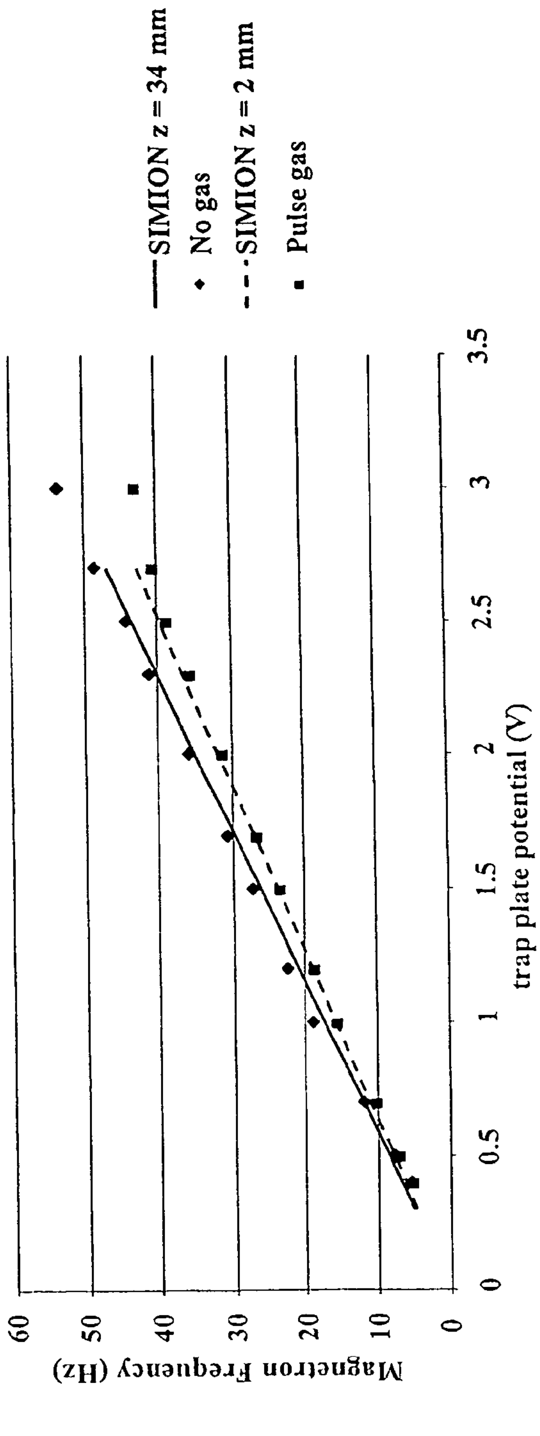
FIG. 10B is a plot of magnetron frequency for cooled and non-cooled gas samples versus various trapping-plate potentials, obtained in Experiment 2.
Figure 12A:
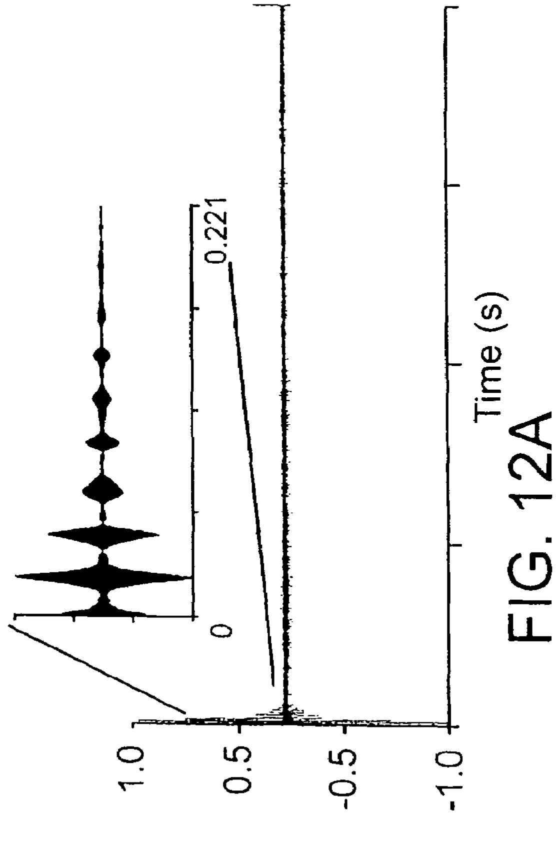
FIGS. 12A and 12B are time-domain and m/z plots, respectively, for melittin obtained using a non-TREC.
Figure 12B:
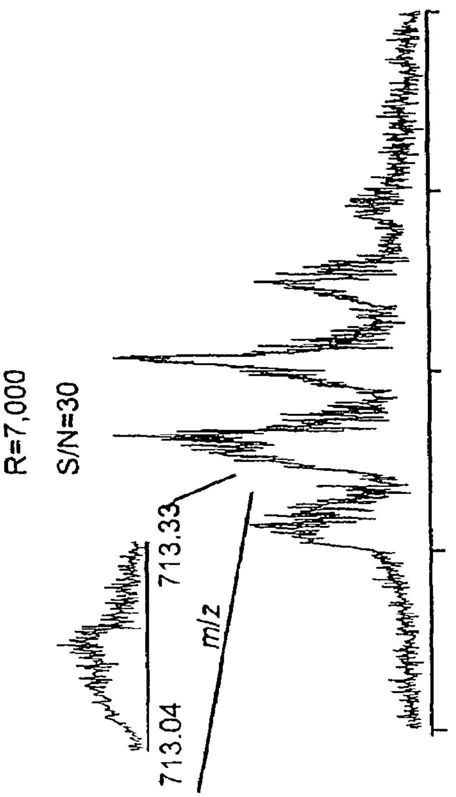
Figure 12C:
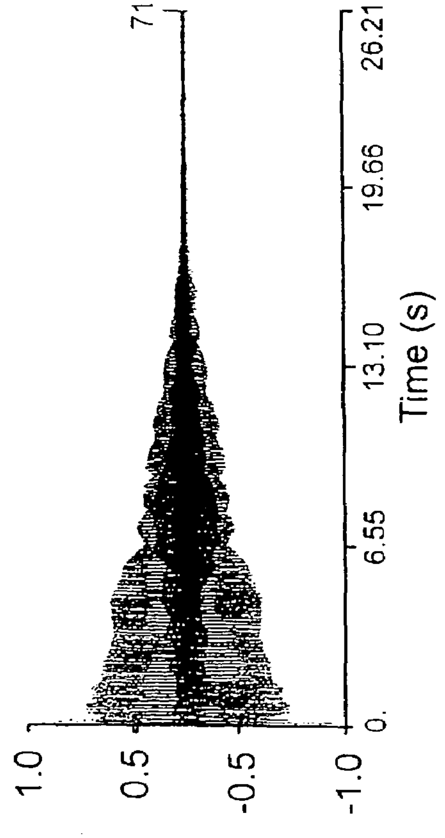
FIGS. 12C and 12D are time-domain and m/z plots, respectively, for melittin obtained using a TREC, obtained in Experiment 4.
Figure 12D:
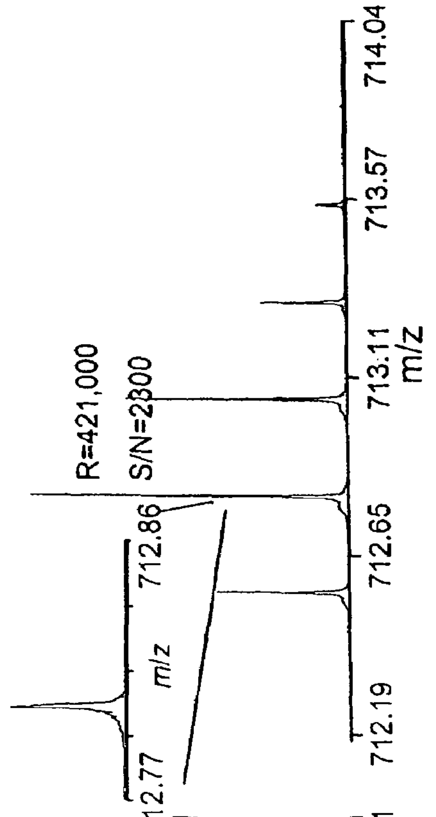

Experimentally derived magnetron frequencies at different trapping-electrode potentials are plotted in FIG. 10B. The respective experiments involving pulsed-gas cooling and no pulsed-gas cooling exhibited different calculated magnetron frequencies because the z-axis oscillation amplitudes for trapped ions were different in these two experiments. As the trapping-plate potential increased, the differences in observed magnetron frequencies increased. The experimental results can be compared to magnetron frequencies calculated with SIMION 7.0. Magnetron frequency depends on both the radial position of ions and the axial amplitude of ions because an REF in an ICR cell varies as a function of cell radius and z-axis position. In SIMION calculations, the magnetron frequency was calculated: (a) for ions having a z-axis oscillation amplitude of 2 mm and a radial position of 10 mm to compare with results from the pulsed-gas experiments, and (b) for ions having a z-axis oscillation amplitude of 38 mm and a radial position of 10 mm to compare with results from the experiments involving no pulsed gas. The radial position of 10 mm was chosen to correspond to a calculated excited cyclotron radius. The experimental and calculated magnetron frequencies matched closely, indicating that ions of different z-axis oscillation amplitudes have different magnetron frequencies.

The z-axis motion of a cooled ion packet was amplified in additional experiments to further investigate the effect of a distribution of axial oscillation amplitudes on observed ion-cyclotron frequency. Axial motion was excited by first cooling an ion packet to the middle of the ICR cell with cooling gas. Then, the potential on the back group of trapping electrodes was reduced to ground (0 V) successive times for a total of ten cycles. During one cycle, 1.5 volts was applied to both groups of trapping electrodes. After an eight-second delay the potential on the back group of trapping electrodes was reduced to ground (0 V) for a defined period of time (51 to 2000 μs), then returned to 1.5 V for 400 μsec, then reduced again to ground potential. Meanwhile, the front group of trapping electrodes remained at 1.5 V. The number of times that the potential of the back group of trapping electrodes was reduced and increased varied between one and ten. In this manner, the ions were moved from the middle of the trap and excited into z-axis motion.

EXPERIMENT 3

FIG. 11 presents results from experiments in which the duration of the "pulse length" to ground on the back group of trapping electrodes was varied from 0.0 ms to 0.402 ms. When the potential of the back group of trapping electrodes was reduced for a time period approximating one period of trapping motion, the axial distribution of the ions changed. The calculated period of trapping oscillation period for bradykinin $(M+2H)^{2+}$ ions with a 1.5 V trapping potential was 0.323 ms. If the "pulse length" was too long or too short the observed cyclotron frequency shifted back to the original frequency. The frequency of oscillation of the voltage applied to the trapping electrodes was approximated at twice the trapping frequency when the "pulse length" matched the period of trapping oscillation. At this pulse length it was possible to excite cooled ions into axial motion and produce increased amplitudes of axial oscillation of the ions.

The total ion intensity remained relatively constant during the experiments, indicating that ions were not being ejected from the ICR cell when the potential applied to the trapping electrodes was reduced to ground (0 V). However, if the time period in which the potential of the back trapping electrodes was at ground was too long (e.g., >2 ms), then ion intensity decreased. These results agree with other experimental results demonstrating that ions having larger axial kinetic energies tend to have lower observed cyclotron frequencies. When the ions were excited to larger z-axis amplitudes, the observed frequency shift was to a frequency about 4.5 Hz lower. The difference in magnetron frequency calculated with SIMION 7.0 for ions having z-axis amplitudes of 2-38 mm, located at a radial position of 10 mm, and with 1.5 V applied to the trapping electrodes, was about 4.1 Hz. The experimental results in FIGS. 11A-11H compared well with this calculated value.

Therefore, a decrease in the observed cyclotron frequency, occurring whenever amplitudes of z-axis oscillation are increased, accompanies a change in the magnetron frequency.

EXPERIMENT 4

Experiments involving a TREC ICR cell were performed using a 3-Tesla FTICR mass spectrometer. Melittin ions were generated by ESI and injected into the ICR cell using a quadrupole ion guide. Ions were trapped in the cell with gated trapping by rapidly increasing the applied trapping potentials as the pulsed ion packet traversed the cell.

The ICR cell was cylindrically shaped. Each group of trapping electrodes (located at respective longitudinal ends of the cell) comprised five independently controlled ring electrodes. The ring electrodes were arranged concentrically. Such a cell is called a "trapping ring electrode cell" or "TREC", such as shown in FIG. 2. By controlling the respective voltages applied to these five ring electrodes, the REF in the TREC was changed. Each ring electrode was wired to a respective pin of a multi-pin vacuum feed-through, and each pin was connected to a respective output of a National Instruments PCI 6723 32-channel 13-bit static and waveform analog output board. A program, written in LABVIEW 7.0, was used to apply independent computer-controlled analog voltages to each ring electrode during the TREC experiments.

In the TREC experiments a non-constant potential profile was applied to the ring-shaped trapping electrodes. In the non-TREC experiments a constant potential profile was applied to the trapping electrodes to simulate the performance of a conventional cell such as an "infinity cell." Results from the TREC experiments were compared to corresponding measurements taken during the non-TREC experiments.

With all the ring electrodes being held at a potential of 2 V ("non-TREC" mode), the observed cyclotron signal lasted approximately 0.5 seconds. When a variable potential profile was applied to the trapping electrodes, the detectable signal lasted longer. For example, when the following respective voltages were applied to the trapping electrodes (from the inner to the outer ring): 0.2 V, 1.2 V, 2 V, 2.4 V, 2.8 V, the detectable signal lasted longer than 13 seconds. In this experiment, a greater than 25-fold improvement in the duration of the detectable cyclotron signal was obtained by independently varying the respective voltages applied to the trapping electrodes of the TREC.

In FIGS. 12A-12D comparisons are shown for constant instrumental conditions under non-TREC (FIGS. 12A-12B) and TREC (FIGS. 12C-12D) modes. Specifically, time-domain signals (FIGS. 12A and 12C) and mass spectra (FIGS. 12B and 12D) were plotted for melittin samples. The non-TREC melittin spectrum (FIG. 12B) was recorded with the same number of data points, which may have added noise to the spectrum.

Figure 13A:
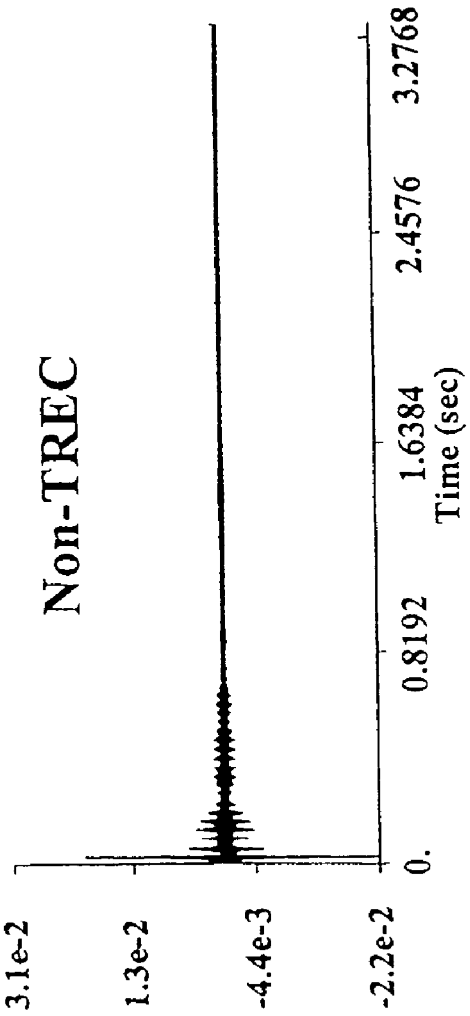
FIGS. 13A and 13B are time-domain plots of signals, with ion cooling, from a non-TREC and a TREC, respectively, obtained in Experiment 4.
Figure 13B:
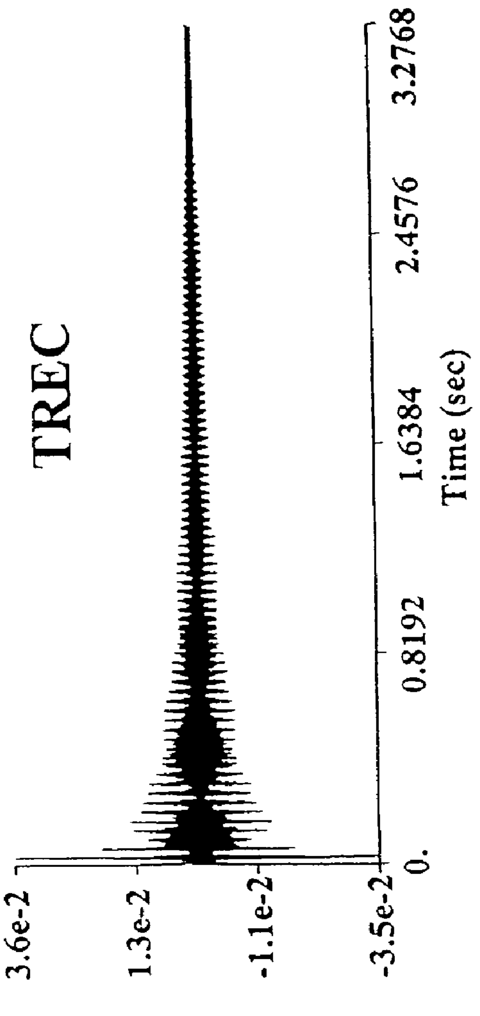

FIGS. 13A-13B compare time-domain signals detected during a TREC experiment (FIG. 13B) and a non-TREC experiment (FIG. 13A) with ion cooling. In each experiment, melittin 5+ ions were trapped in an ICR cell by gated trapping. The ions were cooled by administering a pulse of nitrogen gas. After cooling, gas ions were excited to an approximately 1-cm cyclotron radius, which was just under 50% of the ICR cell radius. During the non-TREC experiment (FIG. 13A), all the trapping electrodes were held at 2 V, and the observable signal lasted about a second. During the TREC experiment (FIG. 13B), the potential profile applied to the trapping electrodes was: 0.2 V, 1.2 V, 2 V, 2.4 V, 2.8 V from the inner to the outer electrodes, respectively. The TREC signal was observable for over three seconds.

Figures 14A, 14B, 14C, 14D, 14E:
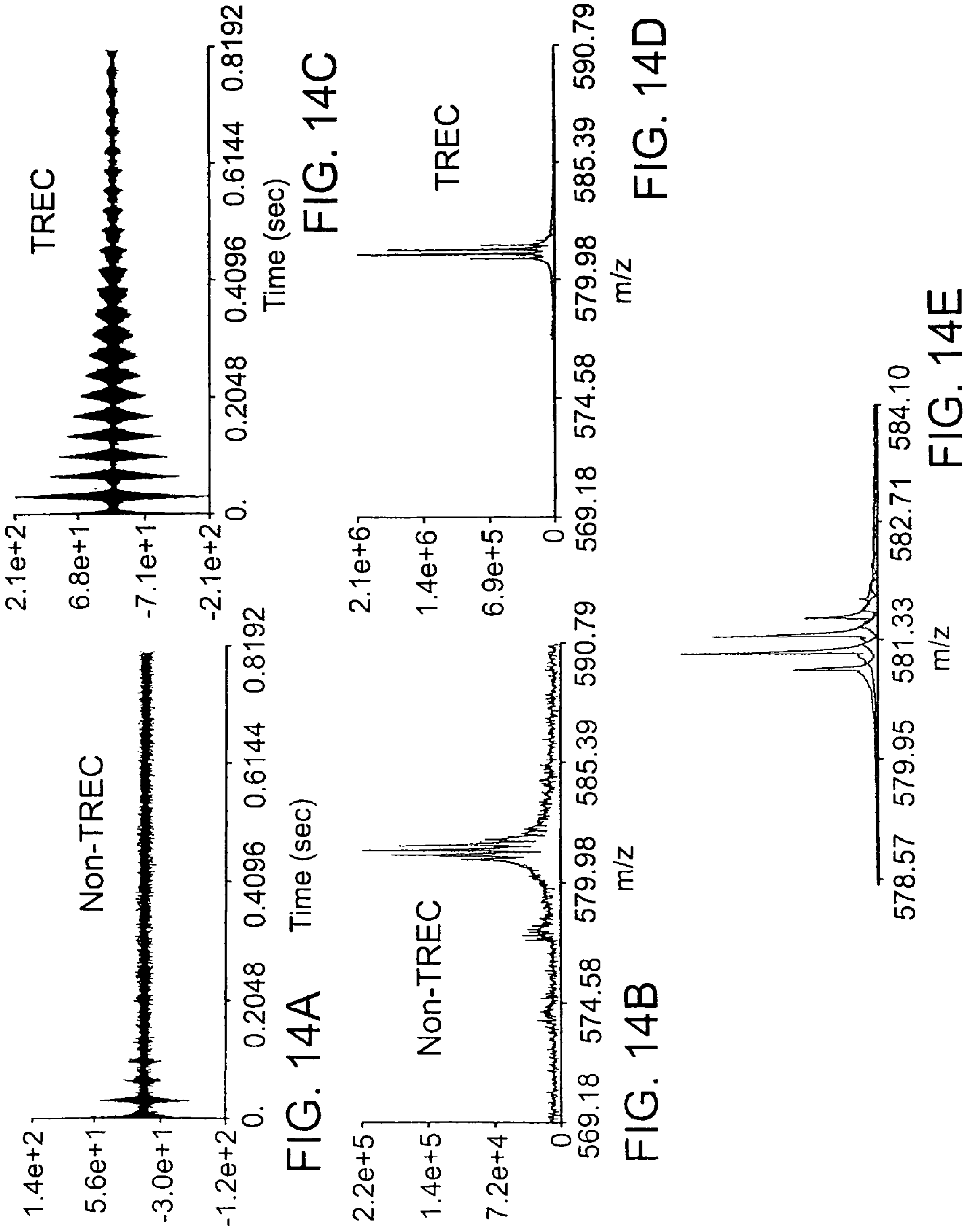
FIGS. 14A-14B are time-domain and m/z plots obtained with a non-TREC.
FIGS. 14C-14D are time-domain and m/z plots obtained with a TREC, obtained in Experiment 4.
FIG. 14E is the mass spectrum of mellitin.
Figure 15:
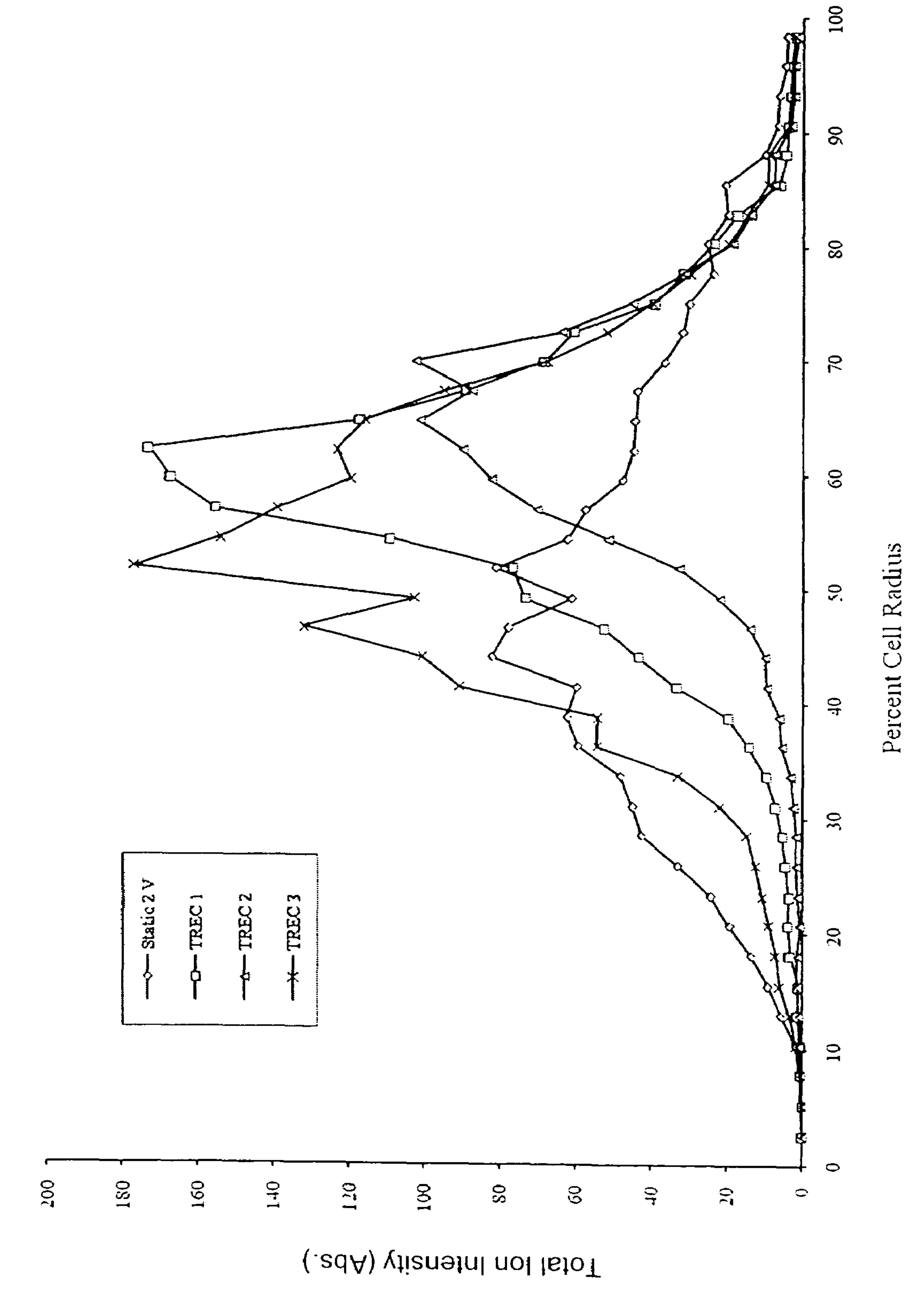
FIG. 15 shows the total ion intensity (absolute) of the bradykinin $[M+2H]^{2+}$ isotopic envelope versus % cell radius for static 2 V trapping compared to a variety of TREC voltage profiles.

FIGS. 14A-14D show time-domain signals (FIGS. 14A and 14C) and mass spectra (FIGS. 14B and 14D) measured in a TREC experiment (FIGS. 14C and 14D) and a non-TREC experiment (FIGS. 14A and 14B). In each experiment, ions were accumulated with gated trapping in the ICR cell. Trapped ions were excited to 50% of the ICR cell radius then detected. During the non-TREC experiment all the trapping electrodes were held at 2 V for the excitation and detection stages. During the TREC experiment, all the trapping electrodes were held at 2 V during excitation; then, during detection, the following potential profile was applied to the trapping electrodes: 0.2 V, 1.2 V, 2 V, 2.4 V, 2.8 V, from the innermost ring to the outermost ring, respectively. The depicted mass spectra (FIGS. 14B and 14D) are of the 5+ charge state of melittin (see FIG. 14E). The time-domain signals and the mass spectra both exhibit noticeable improvements obtained in the TREC experiments compared to the non-TREC experiments. FIG. 15 shows the total ion intensity (absolute) of the bradykinin $[M+2H]^{2+}$ isotopic envelope versus % cell radius for static 2 V trapping compared to a variety of TREC voltage profiles.

Whereas the invention has been described in connection with representative embodiments, it will be understood that it is not limited to those embodiments. On the contrary, it is intended to encompass all alternatives, modifications, and equivalents as may be included within the spirit and scope of the invention as defined by the appended claims.

What is claimed is:

1. A device for trapping ions for mass analysis, comprising:

a cell having a first end and a second end; and a first group of multiple trapping electrodes associated with the first end and a second group of multiple trapping electrodes associated with the second end, the first and second groups of trapping electrodes being positioned to define a trapping region therebetween in the cell, the first and second groups of trapping electrodes being operable to generate, when energized, a radial electric field that substantially traps ions, introduced into the cell, along an axis of the trapping region.

2. The device of claim 1, further comprising a voltage controller connected to the first and second groups of trapping electrodes and configured to apply respective voltages to electrodes of the first and second groups sufficient to flatten a component of the electric field in the cell that is radial relative to the axis, the respective voltages being different for at least two trapping electrodes of each group.

3. The device of claim 2, wherein the flattened component of the electric field is characterized by a field-flattening parameter of less than about 0.1 V/(m·mm).

4. The device of claim 2, wherein the flattened component of the electric field is characterized by a field-flattening parameter of less than about 0.05 V/(m·mm).

5. The device of claim 2, wherein the voltage controller is configured to apply respective voltages to respective trapping electrodes according to a potential profile.

6. The device of claim 5, wherein, according to the potential profile, at least one pair of adjacent electrodes of each of the first and second groups of trapping electrodes is characterized by a non-zero potential difference.

7. The device of claim 1, wherein the first and second groups of trapping electrodes extend perpendicularly to the axis and axially separated from each other on the axis.

8. The device of claim 1, wherein the first and second groups of trapping electrodes each comprise a respective plurality of annular trapping electrodes spaced apart from each other.

9. The device of claim 8, wherein each of the respective plurality of annular trapping electrodes comprises a respective plurality of concentric ring electrodes that are concentric about the axis.

10. The device of claim 1, further comprising:

at least two excitation electrodes situated relative to the axis between the first and second groups of trapping electrodes; and at least two detection electrodes situated relative to the axis between the first and second groups of trapping electrodes.

11. The device of claim 1, further comprising an ion source upstream of the trapping region and configured to introduce ions into the cell.

12. The device of claim 1, further comprising a magnetic-field source that produces a magnetic field directed such that the trapping region is located within the magnetic field.

13. The device of claim 1, wherein:

the first and second groups of trapping electrodes define a cylindrically shaped trapping region in the cell; and the axis is a longitudinal axis of the trapping region.

14. The device of claim 1, wherein:

the respective multiple electrodes of the first and second groups of trapping electrodes have respective widths measured radially relative to the axis; and the respective widths correspond to respective positions of the electrodes.

15. The device of claim 1, wherein the multiple trapping electrodes in each of the first and second groups are separated from one another by a dielectric.

16. The device of claim 1, configured as an ion-cyclotron resonance cell.

17. The device of claim 1, configured as a trapping ring electrode cell.

18. A method for trapping ions for mass analysis, comprising:

introducing ions to a trapping cell comprising first and second groups of multiple trapping electrodes at first and second ends, respectively, of the cell;

energizing the trapping electrodes of the first and second groups to generate a trapping potential in the cell sufficient to trap at least a portion of the introduced ions along an axis of the cell, the trapping potential including an electric field having a flattened radial component at one or more radial positions; and detecting signals associated with the ions.

19. The method of claim 18, wherein generating the trapping potential comprises applying different voltages to at least two trapping electrodes of each group of trapping electrodes.

20. The method of claim 18, further comprising:

directing a magnetic field having at least some components thereof extending parallel to the axis of the cell; and producing an excitation potential in the trapping cell between the first and second groups of trapping electrodes sufficient to excite at least some of the introduced ions into at least one excited radius of ion motion at a first radial position along the axis.

21. The method of claim 20, further comprising generating a modified trapping potential between the first and second groups of trapping electrodes such that the first radial position correspond with an ion's position along the axis.

22. The method of claim 18, wherein generating the trapping potential comprises applying respective voltages to individual electrodes of each group of multiple trapping electrodes, the applied voltages being according to a selected profile of electrode potentials.

23. The method of claim 22, wherein applying voltages to individual trapping electrodes according to the selected potential profile comprises applying the voltages such that at least one pair of adjacent electrodes of each group of trapping electrodes has a non-zero potential difference therebetween.

24. The method of claim 18, wherein the multiple trapping electrodes of the first and second groups of trapping electrodes are energized such that the electric field is modulated.

25. The method of claim 18, wherein the trapping electrodes are energized to flatten the electric field at a first radial position such that a radial component of the electric field is minimized at the first radial position.

26. A device for mass analysis, comprising:

a cell having a first end and a second end;

a first group of multiple trapping electrodes associated with the first end and a second group of multiple trapping electrodes associated with the second end, the first and second groups of trapping electrodes being positioned to define a trapping region therebetween in the cell, the first and second groups of trapping electrodes being operable to generate, when energized, an electric field that substantially traps ions, introduced into the cell, along an axis of the trapping region;

a voltage controller connected to the first and second groups of trapping electrodes and configured to apply respective voltages to electrodes of the first and second groups sufficient to flatten a component of the electric field in the cell that is radial relative to the axis, the respective voltages being different for at least two trapping electrodes of each group; and at least one excitation electrode and at least one detection electrode situated in the cell between the first and second groups of trapping electrodes.

27. A mass analyzer, comprising:

an ion source;

a trapping cell coupled to the ion source; and an ion detector;

wherein the trapping cell has a first end, a second end, a first group of multiple trapping electrodes associated with the first end, and a second group of multiple trapping electrodes associated with the second end, the first and second groups of trapping electrodes being positioned to define a trapping region therebetween in the cell, the first and second groups of trapping electrodes being operable to generate, when energized, a radial electric field that substantially traps ions, introduced into the cell, along an axis of the trapping region.

28. The mass analyzer device of claim 27, further comprising a voltage controller connected to the first and second groups of trapping electrodes and configured to apply respective voltages to electrodes of the first and second groups sufficient to flatten a component of the electric field in the cell that is radial relative to the axis, the respective voltages being different for at least two trapping electrodes of each group.

29. The mass analyzer of claim 26, wherein the cell is an ICR cell.

30. The mass analyzer of claim 29, configured as an FTICR-MS system.

* * * * *

UNITED STATES PATENT AND TRADEMARK OFFICE

CERTIFICATE OF CORRECTION

PATENT NO. : 7,858,930 B2
APPLICATION NO. : 12/334259
DATED : December 28, 2010
INVENTOR(S) : Nathan K. Kaiser and James E. Bruce It is certified that error appears in the above-identified patent and that said Letters Patent is hereby corrected as shown below:

In the Specification:

Column 3, line 1, "(m-mm)" should be --(m·mm)--

Column 3, line 2, "(m-mm)" should be --(m·mm)--

Column 5, lines 14-15, "in potential well" should be --in a potential well--

Column 8, line 35, "(m-mm)" should be --(m·mm)--

Column 8, line 37, "(mmm)" should be --(m·mm)--

Column 8, line 39, "(m-mm)" should be --(m·mm)--

Column 8, line 40, "(m-mm)" should be --(m·mm)--

Column 11, line 24, "204" should be --304--

Column 11, line 43, "to particularly to" should be --particularly to--

Column 15, line 23, "softward" should be --software--

Column 16, line 45, "exits" should be --exists--

In the Claims:

Column 20, line 25, "and axially" should be --and are axially--

Column 21, line 26, "correspond" should be --corresponds--

Signed and Sealed this
Twenty-third Day of August, 2011

David J. Kappos
*Director of the United States Patent and Trademark Office*